US010887563B2

(12) United States Patent
Watanabe et al.

(10) Patent No.: US 10,887,563 B2
(45) Date of Patent: Jan. 5, 2021

(54) PROJECTION SYSTEM, PROJECTION METHOD, AND PROGRAM RECORDING MEDIUM

(71) Applicant: NEC CORPORATION, Tokyo (JP)

(72) Inventors: Go Watanabe, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/333,622

(22) PCT Filed: Sep. 15, 2017

(86) PCT No.: PCT/JP2017/033411
§ 371 (c)(1),
(2) Date: Mar. 15, 2019

(87) PCT Pub. No.: WO2018/056195
PCT Pub. Date: Mar. 29, 2018

(65) Prior Publication Data
US 2019/0222815 A1 Jul. 18, 2019

(30) Foreign Application Priority Data

Sep. 21, 2016 (JP) ................................. 2016-184072

(51) Int. Cl.
*H04N 9/31* (2006.01)
*G06T 7/00* (2017.01)
(Continued)

(52) U.S. Cl.
CPC .......... *H04N 9/3155* (2013.01); *G01S 17/48* (2013.01); *G03B 21/00* (2013.01); *G03B 21/14* (2013.01);
(Continued)

(58) Field of Classification Search
CPC ... G06K 9/6202; G06T 7/0002; H04N 9/3155
See application file for complete search history.

(56) References Cited

U.S. PATENT DOCUMENTS 6,002,505 A * 12/1999 Kraenert .............. H04N 9/3129
359/196.1
7,364,309 B2 * 4/2008 Sugawara ................ H04N 5/74
348/E5.119
(Continued)

FOREIGN PATENT DOCUMENTS

JP 2001-249399 A 9/2001
JP 2005-109540 A 4/2005
(Continued)

OTHER PUBLICATIONS

Written Opinion for PCT/JP2017/033411, dated Dec. 5, 2017.
(Continued)

*Primary Examiner* — Brian P Yenke
(74) *Attorney, Agent, or Firm* — Sughrue Mion, PLLC

(57) ABSTRACT

To safely project a desired projection image in any projection area, provided is a projection system including: a projection device projecting light forming display information in a projection area; an imaging device capturing a range including the projection area; and a control device controlling to cause the projection device to project light and the imaging device to capture the projection area. The control device includes: an analysis circuit accumulating image information about the projection area captured by the imaging device and detects an abnormality in the projection area by comparing any one piece of accumulated image information about the projection area with image information about the projection area most recently captured by the imaging device; and a safety control circuit executing safety control to change a projection condition for the projection (Continued)

device when an abnormality is detected in the projection area by the analysis circuit.

13 Claims, 28 Drawing Sheets

(51) Int. Cl.
    *H04N 5/74*     (2006.01)
    *G06K 9/62*     (2006.01)
    *G06T 7/521*     (2017.01)
    *G01S 17/48*     (2006.01)
    *G03B 21/14*     (2006.01)
    *G03B 21/00*     (2006.01)
    *G03B 21/28*     (2006.01)

(52) U.S. Cl.
    CPC ............ *G03B 21/28* (2013.01); *G06K 9/6202* (2013.01); *G06T 7/001* (2013.01); *G06T 7/0002* (2013.01); *G06T 7/521* (2017.01); *H04N 5/74* (2013.01); *H04N 9/3161* (2013.01); *G06T 2207/10028* (2013.01); *G06T 2207/30168* (2013.01)

(56) References Cited

U.S. PATENT DOCUMENTS

| | | | |
|---|---|---|---|
| 7,377,656 B2* | 5/2008 | Nojima | G03B 21/10 348/E5.139 |
| 9,016,872 B2* | 4/2015 | Aruga | G03B 21/147 348/586 |
| 9,028,072 B2* | 5/2015 | Chang | G03B 21/2053 348/744 |
| 9,140,967 B2* | 9/2015 | Aoki | G03B 21/60 |
| 9,436,071 B2* | 9/2016 | Kreye | G03B 5/00 |
| 9,500,939 B2* | 11/2016 | Roffet | G03B 21/2033 |
| 10,078,258 B2* | 9/2018 | Okumura | H04N 9/3155 |
| 10,225,529 B2* | 3/2019 | Okumura | G03B 21/2066 |
| 10,742,941 B2* | 8/2020 | Kyosuna | G03B 21/142 |
| 2004/0062393 A1* | 4/2004 | Sitrick | G03B 21/00 380/201 |
| 2005/0128578 A1* | 6/2005 | Sugawara | H04N 5/74 359/443 |
| 2006/0028622 A1* | 2/2006 | Nojima | G03B 21/10 353/75 |
| 2007/0001111 A1* | 1/2007 | Rueb | F16P 3/141 250/236 |
| 2007/0171375 A1* | 7/2007 | Mizuuchi | G03B 21/26 353/30 |
| 2008/0302951 A1* | 12/2008 | Aoki | G01V 8/20 250/221 |
| 2009/0122275 A1* | 5/2009 | Nagashima | H04N 9/3129 353/85 |
| 2010/0033691 A1* | 2/2010 | Hung | H04N 9/3129 353/70 |
| 2010/0177929 A1* | 7/2010 | Kurtz | G06K 9/00228 382/103 |
| 2010/0245586 A1* | 9/2010 | Terauchi | H04N 9/3161 348/164 |
| 2010/0245780 A1* | 9/2010 | Abe | G03B 21/14 353/85 |
| 2011/0300904 A1* | 12/2011 | Osaka | G03B 17/54 455/556.1 |
| 2013/0113685 A1* | 5/2013 | Sugiyama | H04N 13/32 345/32 |
| 2013/0194554 A1* | 8/2013 | Aruga | H04N 9/3194 353/69 |
| 2015/0177604 A1* | 6/2015 | Johnston | G03B 21/2086 455/566 |
| 2015/0219500 A1* | 8/2015 | Maes | H04N 9/3194 353/33 |
| 2017/0114992 A1* | 4/2017 | Dodworth | G01J 1/4257 |
| 2017/0261846 A1* | 9/2017 | Maes | G03B 17/54 |
| 2018/0173083 A1* | 6/2018 | Okumura | H04N 9/315 |
| 2019/0215501 A1* | 7/2019 | Kato | H04N 9/3161 |
| 2019/0302964 A1* | 10/2019 | Kyosuna | G03B 21/14 |
| 2020/0004115 A1* | 1/2020 | Kyosuna | G02B 27/0018 |
| 2020/0019050 A1* | 1/2020 | Watanabe | G02B 27/01 |
| 2020/0021786 A1* | 1/2020 | Watanabe | H04N 9/312 |
| 2020/0025882 A1* | 1/2020 | Watanabe | G01S 7/484 |

FOREIGN PATENT DOCUMENTS

| | | |
|---|---|---|
| JP | 2007-086545 A | 4/2007 |
| JP | 2007-264228 A | 10/2007 |
| JP | 2008-216578 A | 9/2008 |
| JP | 2009-098325 A | 5/2009 |
| JP | 2009-122482 A | 6/2009 |
| JP | 2010-243940 A | 10/2010 |
| JP | 2011-050013 A | 3/2011 |
| JP | 2011-257644 A | 12/2011 |
| JP | 2013-064827 A | 4/2013 |
| JP | 2014-126722 A | 7/2014 |
| JP | 2016-057552 A | 4/2016 |

OTHER PUBLICATIONS

International Search Report for PCT/JP2017/033411, dated Dec. 5, 2017.
Communication dated Aug. 11, 2020 from Japanese Patent Office in JP Application No. 2018-541031.

* cited by examiner

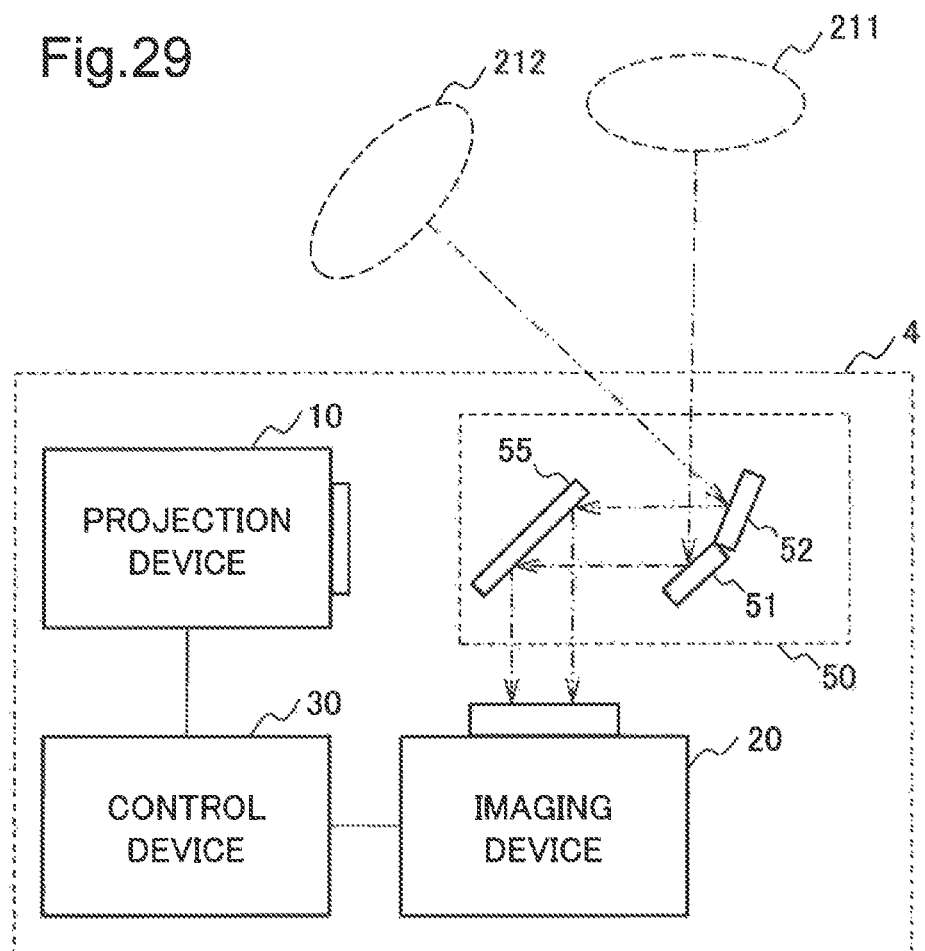

PROJECTION SYSTEM, PROJECTION METHOD, AND PROGRAM RECORDING MEDIUM

CROSS REFERENCE TO RELATED APPLICATIONS

This Application is a National Stage of International Application No. PCT/JP2017/033411 filed Sep. 15, 2017, claiming priority based on Japanese Patent Application No. 2016-184072 filed Sep. 21, 2016, the disclosure of which is incorporated herein in its entirety by reference.

TECHNICAL FIELD

The present invention relates to a projection system, a projection method, and a program for safely projecting a laser beam.

BACKGROUND ART

When information necessary for a user who uses a public facility, such as a hotel or a hall, can be displayed on a ceiling, a wall, or the like in the facility, convenience can be improved. For example, a use scene in which information for guiding a user who has checked in to his/her room, or information indicating a direction for evacuation in case of emergency is displayed in a facility is assumed.

Using a general projector 100, as illustrated in FIG. 25, when projection light is projected in a projection area 210 in which a reflector 40 is located, reflected light 400 reflected by the reflector 40 may travel in an unintended direction. In this case, a laser beam emitted from the projector 100 may be irradiated to a person.

In addition, when an earthquake, fire, or the like occurs, as illustrated in FIG. 26, a ceiling or a wall surface on which the projector 100 is installed may be collapsed. In this case, when the projector 100 continuously emits a laser beam, the laser beam may be irradiated to a person located near the projector 100.

PTL 1 discloses an image projection method that immediately blocks a laser beam when a person enters a laser beam projection area. In the method of PTL 1, a detection wave is projected on a screen simultaneously with a laser beam for projecting a display image, and a reflected wave of the detection wave is monitored. In the method of PTL 1, a laser beam is blocked based on a change in intensity of the reflected wave which is caused by a person entering a laser beam projection range.

PTL 2 discloses a projector capable of automatically adjusting a projection image. The projector of PTL 2 captures an image of a projection area for a projection image, and separates the projection image and a background image from the captured image. Then, the projector of PTL 2 automatically adjusts projection light, based on the separated projection image and background image.

CITATION LIST

Patent Literature

[PTL 1] Japanese Unexamined Patent Application Publication No. 2001-249399
[PTL 2] Japanese Unexamined Patent Application Publication No. 2007-264228

SUMMARY OF INVENTION

Technical Problem

According to the method of PTL 1, it is possible to prevent a laser beam from being irradiated to a person who has entered a projection area. Further, according to the projector of PTL 2, a change is verified by using a background image and a projection image, thereby making it possible to project the projection image with an appropriate amount of light depending on a tendency of the projection image to be displayed and an installation environment of the projector.

However, in the techniques in PTLs 1 and 2, when a reflector is originally located in a laser beam projection area, a reflected wave of a detection wave projected in the projection area would not change. Accordingly, the techniques in PTLs 1 and 2 have a problem that, when a reflector is originally located in a laser beam projection area, the laser beam reflected by the reflector may be irradiated to a person located outside the projection area.

In order to solve the above-described problem, an object of the present invention is to provide a projection system capable of safely projecting a desired projection image in any projection area.

Solution to Problem

A projection system according to the present invention includes: a projection device that projects light forming display information in a projection area; an imaging device that captures an image of a range including the projection area; and a control device that controls to cause the projection device to project light and controls to cause the imaging device to capture an image of the projection area. The control device includes: an analysis circuit that accumulates image information about the projection area captured by the imaging device, and detects an abnormality in the projection area by comparing any one piece of the accumulated image information about the projection area with image information about the projection area most recently captured by the imaging device; and a safety control circuit that executes safety control to change a projection condition for the projection device when an abnormality is detected in the projection area by the analysis circuit.

A projection method according to the present invention includes: projecting light forming display information in a projection area; capturing an image of a range including the projection area; accumulating image information about the captured projection area; detecting an abnormality in the projection area by comparing any one piece of the accumulated image information about the projection area with image information about the projection area most recently captured; and executing safety control to change a projection condition when an abnormality is detected in the projection area.

A projection program according to the present invention causes a computer to execute: processing of projecting light forming display information in a projection area; processing of capturing an image of a range including the projection area; processing of accumulating image information about the captured projection area; processing of detecting an abnormality in the projection area by comparing any one piece of the accumulated image information about the projection area with image information about the projection area most recently captured; and processing of executing safety control to change a projection condition when an abnormality is detected in the projection area.

Advantageous Effects of Invention

According to the present invention, it is possible to provide a projection system capable of safely projecting a desired projection image in any projection area.

BRIEF DESCRIPTION OF DRAWINGS

FIG. 29 is a conceptual diagram illustrating an example in which images of a plurality of projection areas are guided to an imaging device by a plurality of reflecting mirrors and half mirrors included in the projection system according to the fourth example embodiment of the present invention.

EXAMPLE EMBODIMENT

Figure 1:
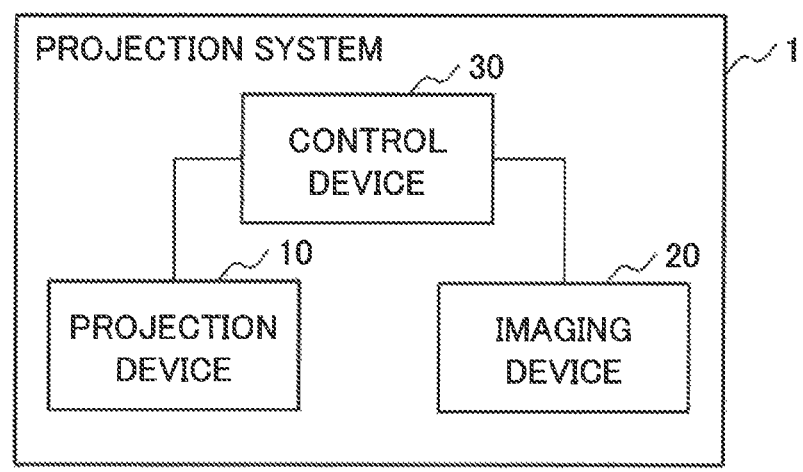
FIG. 1 is a block diagram illustrating a configuration of a projection system according to a first example embodiment of the present invention.

Example embodiments of the present invention will be described below by using the drawings. Although technically preferable limitations are made in the following example embodiments in order to carry out the present invention, the scope of the invention is not limited to the following example embodiments. In all the drawings used for explaining the following example embodiments, like parts are denoted by like reference numerals, unless there are particular reasons. In the following example embodiments, repeated descriptions of similar configurations and operations may be omitted.

First Example Embodiment

[Configuration]

First, a projection system according to a first example embodiment of the present invention will be described by using the drawings.

FIG. 1 is a block diagram illustrating a configuration of a projection system 1 according to this example embodiment. As illustrated in FIG. 1, the projection system 1 includes a projection device 10, an imaging device 20, and a control device 30.

The projection device 10 projects projection light toward a projection area in accordance with control by the control device 30. The projection area refers to a display range for display information that is formed by projection light projected by the projection device 10.

The imaging device 20 is a camera that captures an image of a range including a projection area 210. The range including the projection area is a range including the projection area and its peripheral area. Note that the imaging device 20 may also capture an image of an area that does not include the projection area together.

The control device 30 controls the projection device 10 and the imaging device 20. The control device 30 performs control in such a way as to cause the projection device 10 to project projection light in the projection area. The control device 30 performs control to cause the imaging device 20 to capture an image of the projection area.

Further, the control device 30 detects a change in the projection area from imaging data on the projection area. For example, the control device 30 compares latest data obtained by capturing an image of the projection area with any one piece of previous data, and detects, as an abnormality, a change occurring in the projection area, based on the difference therebetween.

Upon detecting an abnormality in the projection area 210, the control device 30 executes safety control to deal with the abnormality. For example, upon detecting an abnormality in a projection area, the control device 30 performs safety control to stop a light source of the projection device 10. Further, for example, upon detecting an abnormality in a projection area, the control device 30 performs safety control to shift a projection direction of projection light from the projection device 10.

[Projection Device]

Figure 2:
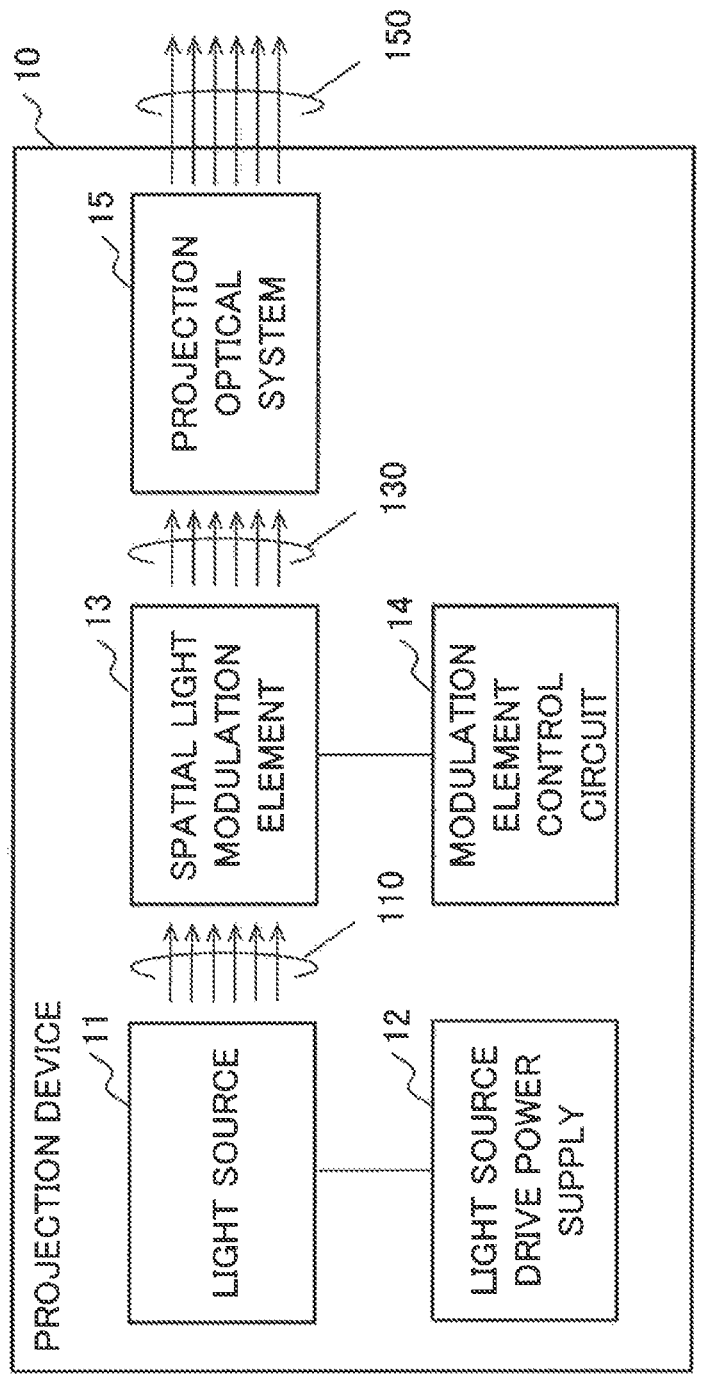
FIG. 2 is a block diagram illustrating a configuration of a projection device of a projection system according to the first example embodiment of the present invention.
Figure 3:
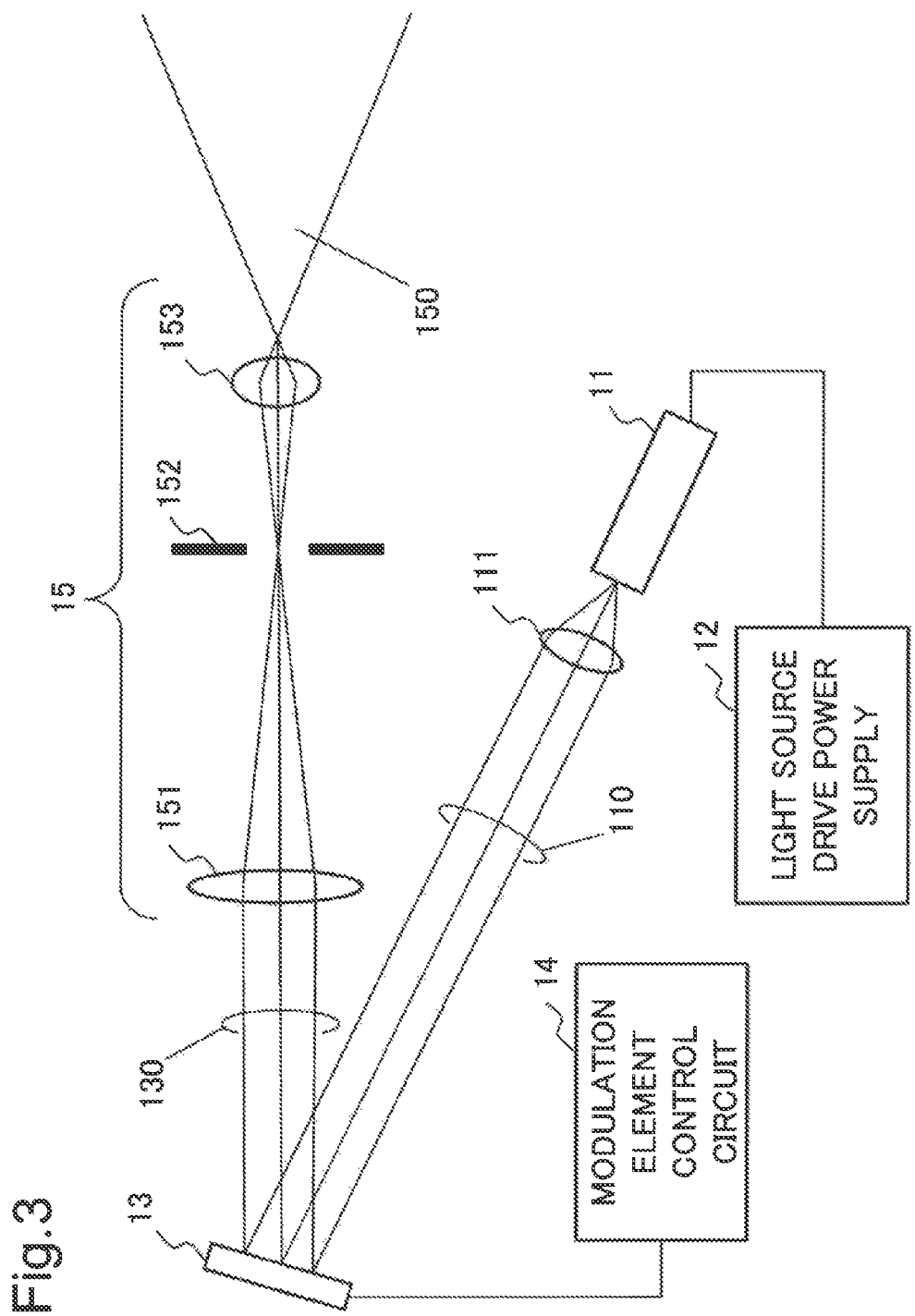
FIG. 3 is a conceptual diagram illustrating a configuration of a projection optical system of the projection system according to the first example embodiment of the present invention.

Next, the configuration of the projection system 1 according to this example embodiment will be described in detail. FIG. 2 is a block diagram illustrating a configuration of the projection device 10. FIG. 3 is a conceptual diagram illustrating a configuration example of an optical system of the projection device 10. Note that FIG. 2 illustrates a conceptual configuration, in which a part of the configuration illustrated in FIG. 3 is omitted.

As illustrated in FIG. 2, the projection device 10 includes a light source 11, a light source drive power supply 12, a spatial light modulation element 13, a modulation element control circuit 14, and a projection optical system 15.

The light source 11 emits light with a specific wavelength. For example, the light source 11 can be configured as a laser light source. In general, the light source 11 is configured to emit light in a visible region. The light source 11 may be configured to emit light in regions other than the visible region, such as an infrared region or an ultraviolet region. The following description is made assuming that the light source 11 emits a laser beam.

As illustrated in FIG. 3, the laser beam emitted from the light source 11 is converted into coherent light 110 by a collimator 111, and enters a display unit of the spatial light modulation element 13. For example, the light source 11 may be configured to be able to emit light with a plurality of wavelengths, the color of display information to be displayed in the projection area can be changed by changing the wavelength of light emitted from the light source 11. Further, the light source 11 may be configured to be able to emit light with different wavelengths simultaneously, display information composed of a plurality of colors can be displayed in the projection area.

The light source drive power supply 12 is a power supply that drives the light source 11 in accordance with control by the control device 30, and emits light from the light source 11.

The spatial light modulation element 13 displays, on the display unit thereof, a pattern for generating display information to be displayed in the projection area in accordance with control by the modulation element control circuit 14. In this example embodiment, the light 110 is irradiated on the display unit of the spatial light modulation element 13 on which a predetermined pattern is displayed, and the reflected light is projected in the projection area from the projection optical system 15, thereby displaying desired display information in the projection area. The pattern may be formed by converting or moving a basic pattern (base pattern), or by combining a plurality of base patterns. Alternatively, a complicated pattern may be prepared in advance. Light reflected by the display unit of the spatial light modulation element 13 is emitted toward the projection optical system 15 as modulated light 130.

As illustrated in FIG. 3, in this example embodiment, an incident angle of the light 110 is set to be non-vertical to the display unit of the spatial light modulation element 13. Specifically, in this example embodiment, an emission axis of the light 110 emitted from the light source 11 is set to be oblique to the display unit of the spatial light modulation element 13. When the emission axis of the light 110 is set to be oblique to the display unit of the spatial light modulation element 13, the light 110 can be incident on the display unit of the spatial light modulation element 13 without using any beam splitter, which leads to an improvement in efficiency.

The spatial light modulation element 13 can be implemented by a spatial light modulation element of a phase modulation type that receives the incidence of the coherent light 110 with an aligned phase, and modulates the phase of the incident light 110. Focus-free projection light can be obtained by using the spatial light modulation element 13 of the phase modulation type. Accordingly, there is no need for adjustment to change the focus for each distance even when the projection light is projected at a plurality of projection distances. Note that the spatial light modulation element 13 may be configured by an element of a type different from the phase modulation type, as long as desired display information can be displayed in the projection area. The following description is made assuming that the spatial light modulation element 13 of the phase modulation type is used.

A phase distribution corresponding to display information to be displayed in the projection area is displayed on the display unit of the spatial light modulation element 13 of the phase modulation type. In this case, the modulated light 130 obtained immediately after the light is reflected by the display unit of the spatial light modulation element 13 is converted into an image in which a type of diffraction grating forms an aggregate. When the modulated light 130 reflected by the display unit of the spatial light modulation element 13 is projected, display information is formed in such a way that light diffracted by the diffraction grating gathers. When a phase modulation type element is used as the spatial light modulation element 13, a phase distribution corresponding to display information to be displayed in the projection area is used as a pattern.

The spatial light modulation element 13 is implemented by, for example, a spatial light modulation element using ferroelectric liquid crystal, homogeneous liquid crystal, vertical alignment liquid crystal, or the like. Specifically, the spatial light modulation element 13 can be implemented by Liquid Crystal on Silicon (LCOS). The spatial light modulation element 13 may also be implemented by a Micro Electro Mechanical System (MEMS).

The spatial light modulation element 13 of the phase modulation type can cause a light flux to be concentrated not on the entire projection area, but on a part of the display information. Accordingly, the spatial light modulation element 13 of the phase modulation type can display the display information more brightly with lower power as compared with an element of a type that uniformly projects light over the projection area.

The modulation element control circuit 14 causes the display unit of the spatial light modulation element 13 to display a pattern for generating display information to be displayed in the projection area in accordance with control by the control device 30. Note that when a phase distribution type modulation element is used, the modulation element control circuit 14 causes the display unit of the spatial light modulation element 13 to display a phase distribution corresponding to display information to be displayed in the projection area.

In the case of driving a phase modulation type modulation element, the modulation element control circuit 14 drives the spatial light modulation element 13 in such a way that a parameter that determines a difference between a phase of the light 110 irradiated on the display unit of the spatial light modulation element 13 and a phase of the modulated light 130 reflected by the display unit is changed.

The parameter that determines the difference between the phase of the light 110 irradiated on the display unit of the spatial light modulation element 13 of the phase modulation type and the phase of the modulated light 130 reflected by the display unit is, for example, a parameter related to optical characteristics such as a refractive index and an optical path length. For example, the modulation element control circuit 14 changes the refractive index of the display unit by changing a voltage to be applied to the display unit of the spatial light modulation element 13. As a result, the light 110 irradiated on the display unit is diffracted based on the refractive index of the display unit. Specifically, the phase distribution of the light 110 irradiated on the spatial light modulation element 13 of the phase modulation type is modulated depending on the optical characteristics of the display unit of the spatial light modulation element 13. Note that the method for driving the spatial light modulation element 13 by the modulation element control circuit 14 is not limited to the example described above.

The projection optical system 15 is an optical system that projects, as projection light 150, the modulated light 130 reflected by the spatial light modulation element 13.

As illustrated in FIG. 3, the projection optical system 15 includes a Fourier convert lens 151, an aperture 152, and a projection lens 153. The modulated light 130 emitted from the spatial light modulation element 13 is irradiated as the projection light 150 by the projection optical system 15. Note that any one of the components of the projection optical system 15 may be omitted, as long as display information can be displayed in the projection area. Components other than the Fourier convert lens 151, the aperture 152, and the projection lens 153 may be added to the projection optical system 15.

The Fourier convert lens 151 is an optical lens for forming an image, which is formed when the modulated light 130 reflected by the display unit of the spatial light modulation element 13 is projected at an infinite distance, on a close focus position. In FIG. 3, a focus is formed at the position of the aperture 152.

The aperture 152 includes a function of shielding higher-order light included in the light focused by the Fourier convert lens 151, and specifying a contour of display information. An opening portion of the aperture 152 is formed with a size smaller than an outermost periphery of an image formed at the position of the aperture 152. The aperture 152 is installed in such a way as to shield a peripheral area of the display information at the position of the aperture 152. For example, the opening portion of the aperture 152 is formed in such a way as to have a rectangular shape or a circular shape. Note that the aperture 152 is preferably installed at the focus position of the Fourier convert lens 151. However, the position of the aperture 152 may be shifted from the focus position, as long as the function of eliminating higher-order light can be exerted.

The projection lens 153 is an optical lens that enlarges and projects the light focused by the Fourier convert lens 151. The projection lens 153 projects the projection light 150 in such a way that the modulated light 130 reflected by the spatial light modulation element 13 is displayed as display information in the projection area. Note that the projection lens 153 may be configured by one lens, or may be configured by a combination of a plurality of lenses.

When the projection system 1 is used for a purpose of projecting a line drawing such as a simple symbol, the projection light 150 projected from the projection optical system 15 is not projected uniformly over the entire projection area, but is projected in such a way as to be focused on a part such as a character or symbol that forms display information, or a frame. Accordingly, an amount of power for driving the light source can be suppressed by substantially reducing the amount of emission of the light 110 from the light source 11. In other words, in the projection system 1, since the light source 11 can be configured with a small size and low power, low output of the light source drive power supply 12 for driving the light source 11 can be achieved and thus the overall power consumption can be reduced.

[Imaging Device]

Figure 4:
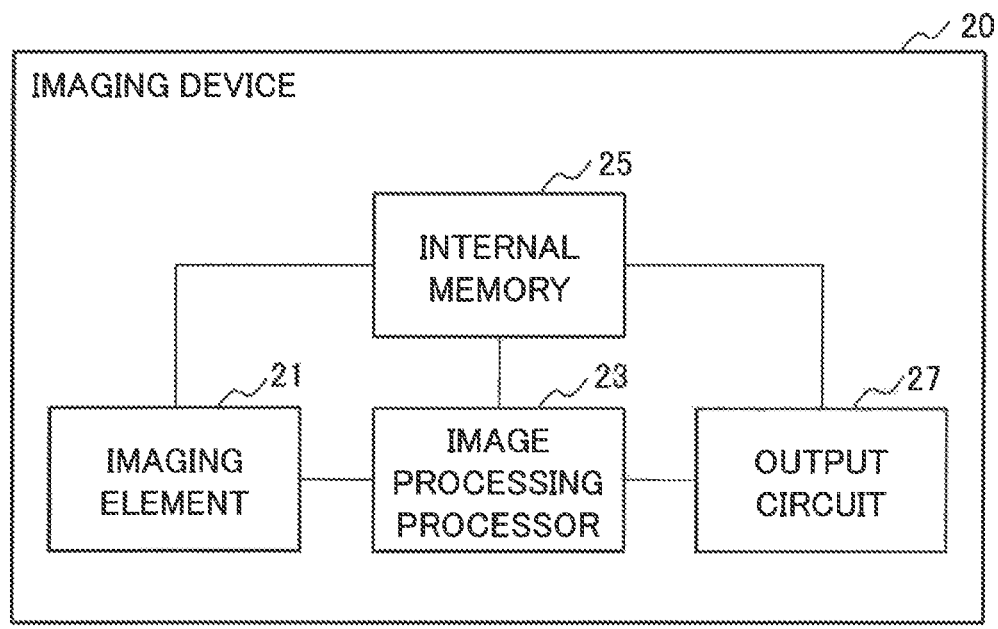
FIG. 4 is a block diagram illustrating a configuration of an imaging device of the projection system according to the first example embodiment of the present invention.

FIG. 4 is a block diagram illustrating a configuration of the imaging device 20. The imaging device 20 includes an imaging element 21, an image processing processor 23, an internal memory 25, and an output circuit 27.

The imaging element 21 is an element for capturing an image of a predetermined imaging area and acquiring imaging data on the imaging area. In this example embodiment, the predetermined imaging area is a range including a projection area. The imaging element 21 is a photoelectric conversion element in which semiconductor components are integrated into a circuit. The imaging element 21 can be implemented by, for example, a solid-state imaging element such as a Charge-Coupled Device (CCD) or Complementary Metal-Oxide-Semiconductor (CMOS). In general, the imaging element 21 is configured by an element that captures an image of light in the visible region. The imaging element 21 may be configured by an element capable of capturing an image of and detecting an electromagnetic wave, such as an infrared ray, ultraviolet ray, X-ray, gamma ray, radio wave, or microwave.

The image processing processor 23 is an integrated circuit that executes image processing, such as dark current correction, interpolation operation, color space conversion, gamma correction, aberration correction, noise reduction, or image compression, on imaging data obtained by capturing an image by the imaging element 21. Note that the image processing processor 23 may be omitted in the case of outputting image information without processing the information.

The internal memory 25 is a storage element that temporarily stores image information that cannot be completely processed when image processing is performed by the image processing processor 23, or processed image information. Note that the internal memory 25 may be configured to temporarily store image information obtained by capturing an image by the imaging element 21. The internal memory 25 may be configured by a general memory.

The output circuit 27 outputs image information processed by the image processing processor 23 to the control device 30.

[Control Device]

Figure 5:
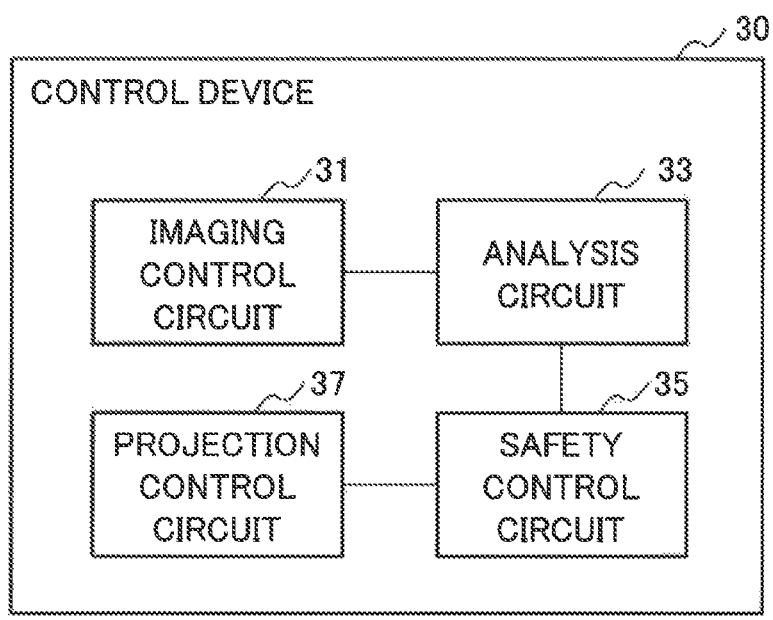
FIG. 5 is a block diagram illustrating a configuration of a control device of the projection system according to the first example embodiment of the present invention.

FIG. 5 is a block diagram illustrating a configuration of the control device 30. The control device 30 includes an imaging control circuit 31, an analysis circuit 33, a safety control circuit 35, and a projection control circuit 37. Note that the control device 30 may include a communication circuit for enabling communication with a higher-order system which is not illustrated.

The imaging control circuit 31 controls the imaging device 20 in such a way as to capture an image of the imaging area at a predetermined timing. The imaging control circuit 31 acquires image information output from the imaging device 20, and outputs the acquired image information to the analysis circuit 33. Note that the analysis circuit 33 may be configured to send an instruction to output image information to the imaging control circuit 31.

The analysis circuit 33 analyzes the image information acquired from the imaging device 20, and determines a difference between the latest data and the previous data on the projection area. When the analysis circuit 33 detects no difference between the latest data and the previous data on the projection area, the analysis circuit 33 outputs a determination result indicating a normal state to the safety control circuit 35. When the analysis circuit 33 detects the difference between the latest data and the previous data on the projection area, the analysis circuit 33 outputs a determination result indicating an abnormal state to the safety control circuit 35.

When the safety control circuit 35 acquires, from the analysis circuit 33, the determination result (normal determination) indicating that the projection area is normal, the safety control circuit 35 outputs a normal determination signal. Note that the safety control circuit 35 may be configured not to output the signal from the safety control circuit 35 to the projection control circuit 37 when it is determined that the projection area is normal.

When the safety control circuit 35 acquires the determination result (abnormality determination) indicating that there is an abnormality in the projection area from the analysis circuit 33, the safety control circuit 35 performs safety control. Upon receiving the abnormality determination, the safety control circuit 35 generates a safety control signal, and outputs the generated safety control signal to the projection control circuit 37. Note that the safety control circuit 35 may be configured to execute safety control for the projection device 10 independently of the projection control circuit 37.

For example, upon receiving the abnormality determination, the safety control circuit 35 generates the safety control signal to send an instruction to stop the projection of light from the projection device 10. For example, upon receiving the abnormality determination, the safety control circuit 35 generates the safety control signal to instruct the projection control circuit 37 to change a projection condition in such a way that the display position of display information to be displayed by the projection light projected from the projection device 10. The safety control circuit 35 may selectively output an instruction to stop the projection and an instruction to shift the display position.

The projection control circuit 37 sets a projection condition for the projection device 10 and controls the projection device 10, based on the projection condition. In a normal state, the projection control circuit 37 outputs a drive control condition for the light source 11 and a modulation element control condition for setting a pattern to be displayed on the display unit of the spatial light modulation element 13 to the projection device 10 as projection conditions.

Upon receiving the safety control signal from the safety control circuit 35, the projection control circuit 37 executes safety control in response to the safety control signal. For example, when the safety control to stop the light source 11 is executed, the projection control circuit 37 may perform control to stop the light source 11, or to prevent the display unit of the spatial light modulation element 13 from reflecting the modulated light 130. Further, for example, when the projection control circuit 37 executes the safety control to shift the projection direction of the projection light 150 from the projection device 10, the projection control circuit 37 may perform control to change the pattern to be displayed on the display unit of the spatial light modulation element 13, and may move the display position of the display information.

[Analysis Circuit]

Figure 6:
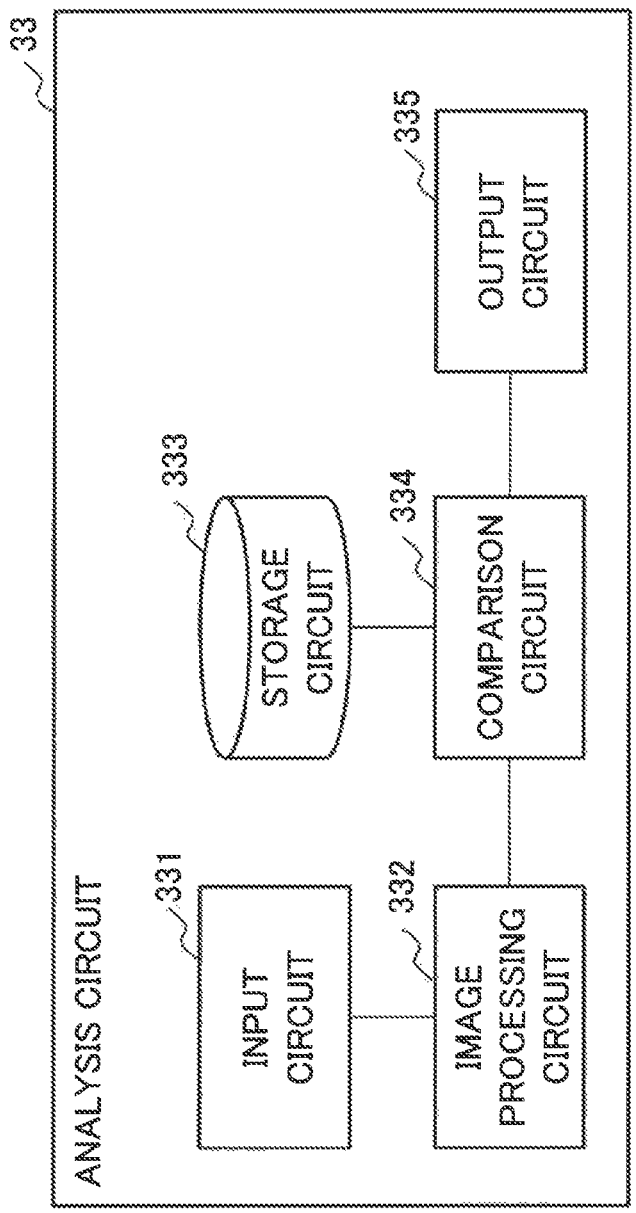
FIG. 6 is a block diagram illustrating a configuration of an analysis circuit included in the control device of the projection system according to the first example embodiment of the present invention.

A configuration of the analysis circuit 33 will be described in detail by using FIG. 6. FIG. 6 is a block diagram illustrating the configuration of the analysis circuit 33. The analysis circuit 33 includes an input circuit 331, an image processing circuit 332, a storage circuit 333, a comparison circuit 334, and an output circuit 335.

The input circuit 331 acquires image information from the imaging control circuit 31. The input circuit 331 outputs the acquired image information to the image processing circuit 332.

The image processing circuit 332 converts the acquired image information into data of a format that can be easily processed, and outputs the data to the comparison circuit 334. For example, when the image information is analog data, the input circuit 331 converts the analog data into digital data, and outputs the digital data. For example, when the image information includes extra information, the image processing circuit 332 outputs the data from which the extra information is deleted to the comparison circuit 334. Note that when the image information acquired from the imaging control circuit 31 is used as it is, the image processing circuit 332 may be omitted.

The storage circuit 333 stores data on the projection area in association with time information. The data stored in the storage circuit 333 may be stored by the comparison circuit 334, or may be stored by the input circuit 331 or the image processing circuit 332. Note that the time information of the data stored in the storage circuit 333 may indicate a time when an image is captured, or a time when data are stored in the storage circuit 333. The display information to be displayed in the projection area may be stored in the storage circuit 333. In a configuration in which the display information to be displayed in the projection area is compared with the current display information, the presence of an abnormality in the projection area can be detected by the analysis circuit 33 when the system is installed.

The comparison circuit 334 causes the storage circuit 333 to store the acquired data. Further, the comparison circuit 334 compares the latest data on the projection area with the previous image data stored in the storage circuit 333. When the comparison circuit 334 determines that the pieces of compared data are identical, the comparison circuit 334 stores the image data input from the input circuit 331 in the storage circuit 333 in association with the time information. Then, the comparison circuit 334 outputs the determination result (hereinafter, referred to as the normal determination) indicating that the latest data match the previous data to the output circuit 335.

When the comparison circuit 334 determines that the pieces of compared data are different, the comparison circuit 334 outputs the determination result (hereinafter, referred to as the abnormality determination) indicating that the latest data are different from the previous data to the output circuit 335.

The output circuit 335 outputs the determination result obtained by comparing the latest data and the previous data on the projection area. That is, the output circuit 335 outputs any one of the normal determination and the abnormality determination, to the safety control circuit 35. For example, when the normal determination is output, the output circuit 335 may not change the output signal, and when the abnormality determination is output, the output circuit 335 may change the output signal.

[Projection Control Circuit]

Figure 7:
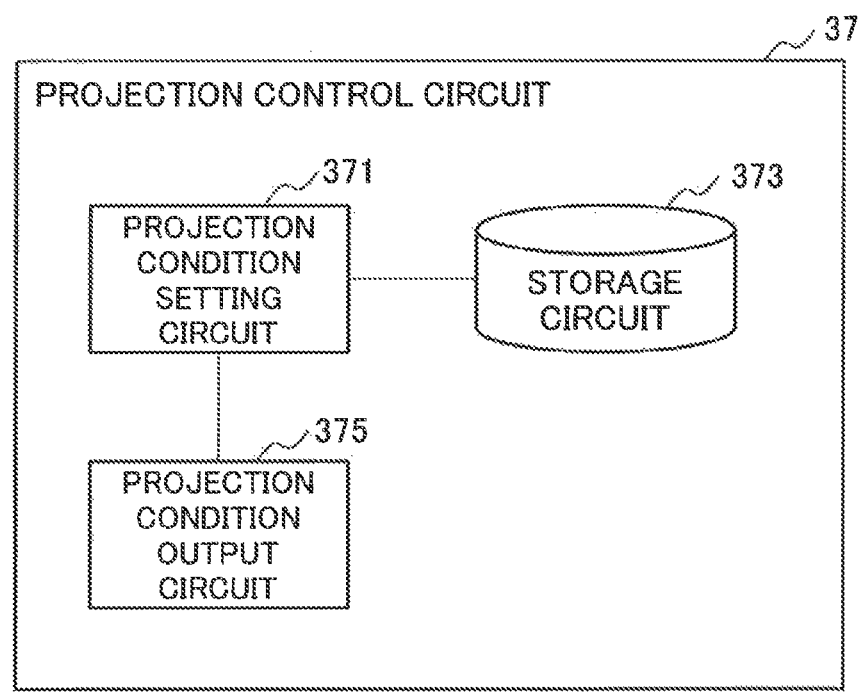
FIG. 7 is a block diagram illustrating a configuration of a projection control device included in the control device of the projection system according to the first example embodiment of the present invention.

A configuration of the projection control circuit 37 will be described by using FIG. 7. FIG. 7 is a block diagram illustrating the configuration of the projection control circuit 37. As illustrated in FIG. 7, the projection control circuit 37 includes a projection condition setting circuit 371, a storage circuit 373, and a projection condition output circuit 375.

The projection condition setting circuit 371 sets projection conditions including a control condition for the light source 11 (hereinafter, referred to as drive control condition) and a control condition for the spatial light modulation element 13 (hereinafter, referred to as modulation element control condition) in accordance with an instruction from a higher-order system, which is not illustrated, or a program stored in the projection condition setting circuit.

For example, the projection condition setting circuit 371 may be configured to be connected to a higher-order system, such as a server, via a network such as the Internet or an intranet. Further, for example, the projection condition setting circuit 371 may be configured to be connected to an input device (not illustrated) for inputting a user's operation, and to receive the operation on the input device as a projection condition.

The projection condition setting circuit 371 sets drive control conditions including a timing when the light source 11 emits light, and a condition for the output from the light source 11. The projection device 10 can project projection light in the projection area at a predetermined timing in accordance with the drive control condition for the light source 11.

Further, when the predetermined display information is displayed on the projection device 10, the projection condition setting circuit 371 sets the modulation element control condition for causing the display unit of the spatial light modulation element 13 to display a predetermined pattern. The pattern to be displayed on the display unit of the spatial light modulation element 13 may be stored in the storage circuit 373, or may be generated by the projection condition setting circuit 371.

For example, when the pattern itself to be displayed on the display unit of the spatial light modulation element 13 is stored in the storage circuit 373, the projection condition setting circuit 371 may cause the display unit of the spatial light modulation element 13 to display the pattern stored in the storage circuit 373. For example, when a base pattern that forms the pattern to be displayed on the display unit of the spatial light modulation element 13 is stored in the storage circuit 373, the projection condition setting circuit 371 may generate the pattern to be displayed on the display unit by using the base pattern stored in the storage circuit 373.

The storage circuit 373 stores the pattern corresponding to the predetermined display information. Note that the storage circuit 373 may be configured to store the base pattern that forms the pattern. Further, the storage circuit 373 may be configured to store a program in which a projection condition for displaying the display information is set.

The projection condition output circuit 375 outputs the projection condition set by the projection condition setting circuit 371 to the projection device 10.

[Hardware]

A hardware configuration to enable a control system of the projection system according to this example embodiment will be described by taking a control substrate 300 illustrated in FIG. 8 as an example. The control substrate 300 may be configured by a single substrate, or may be configured by a combination of a plurality of substrates.

Figure 8:
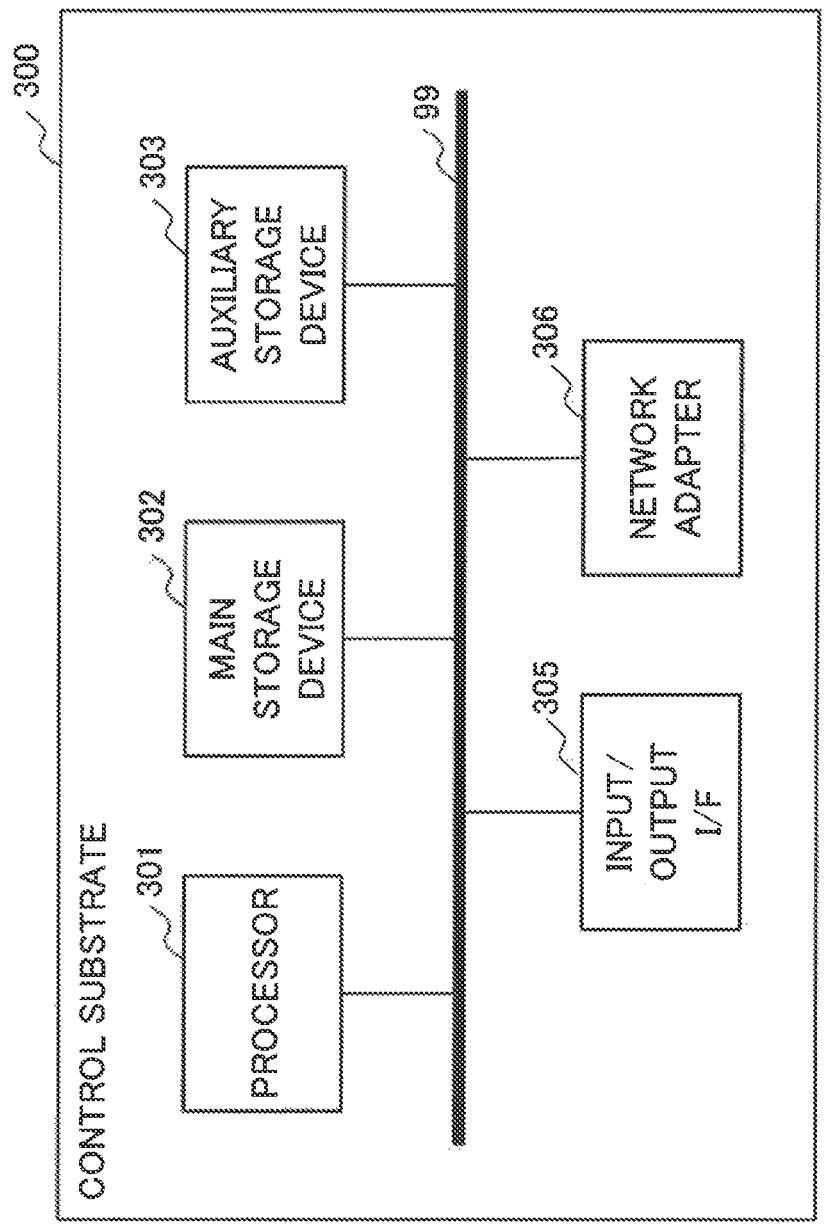
FIG. 8 is a block diagram illustrating an example of a hardware configuration for implementing the projection system according to the first example embodiment of the present invention.

As illustrated in FIG. 8, the control substrate 300 includes a processor 301, a main storage device 302, an auxiliary storage device 303, an input/output interface 305, and a network adapter 306. In FIG. 8, an interface is abbreviated as I/F for description. The processor 301, the main storage device 302, the auxiliary storage device 303, the input/output interface 305, and the network adapter 306 are connected via a bus 99 in such a way that data can be exchanged with each other. Further, the processor 301, the main storage device 302, the auxiliary storage device 303, and the input/output interface 305 are connected to a network (not illustrated), such as the Internet or an intranet, via the network adapter 306. When the control substrate 300 is connected to a server or a computer in a higher-order system via a network, a phase distribution of display information, a projection condition, a safety control condition, and the like can be acquired from the higher-order system.

The processor 301 loads a program stored in the auxiliary storage device 303 or the like into the main storage device 302, and executes the loaded program. In this example embodiment, a configuration using a software program installed on the control substrate 300 may be employed. The processor 301 executes arithmetic processing or control processing to be executed by the control device or the like according to this example embodiment.

The main storage device 302 includes an area in which the program is loaded. The main storage device 302 may be, for example, a volatile memory such as a Dynamic Random Access Memory (DRAM). Further, a nonvolatile memory such as a Magnetoresistive Random Access Memory (MRAM) may be configured or added as the main storage device 302.

The auxiliary storage device 303 is a means for storing data such as a phase distribution corresponding to display information to be displayed in the projection area. The auxiliary storage device 303 is implemented by a local disk such as a hard disk or a flash memory. Note that the main storage device 302 may be configured to store the phase distribution of the display information, and thus the auxiliary storage device 303 can be omitted.

The input/output interface 305 is a device that connects the control substrate 300 with peripheral devices, based on connection standards between the control substrate 300 and the peripheral devices. The network adapter 306 is an interface for connecting to a network, such as the Internet or an intranet, based on standards or specifications. The input/output interface 305 and the network adapter 306 may be commonly used as an interface for connecting to an external device.

The control substrate 300 may be configured to enable input devices such as a keyboard, a mouse, and a touch panel to be connected thereto, as needed. These input devices are used for input information and settings. Note that when the touch panel is used as an input device, a display screen of a display device may be configured to function as an interface with the input device. Exchange of data between the processor 301 and the input device may be mediated by the input/output interface 305.

The network adapter 306 is connected to a higher-order system such as another computer or server, via a network. The higher-order system transmits the phase distribution of the display information used in this example embodiment to the control substrate 300 via the network adapter 306. In the higher-order system, the phase distribution of the display information used in this example embodiment may be generated by its own device, or may be acquired from another device.

The control substrate 300 may be provided with a display device for displaying information. When the display device is provided, a display control device (not illustrated) for controlling display of a display device may be installed on the control substrate 300. The display device can be connected to the control substrate 300 via the input/output interface 305.

Further, the control substrate 300 may be provided with a reader/writer, as needed. The reader/writer is connected to the bus 99. The reader/writer mediates reading of data or a program from a recording medium (program recording medium), which is not illustrated, writing of a processing result of the control substrate 300 into the recording medium, and the like, between the processor 301 and the recording medium. The recording medium can be implemented by, for example, a semiconductor recording medium, such as a Secure Digital (SD) card or a Universal Serial Bus (USB) memory, and the like. The recording medium may also be implemented by a magnetic recording medium, such as a flexible disk, an optical recording medium, such as a Compact Disc (CD) or Digital Versatile Disc (DVD), or other recording media.

An example of the hardware configuration of the control system that enables the projection system 1 according to this example embodiment has been described above. Note that the hardware configuration illustrated in FIG. 8 is an example of the hardware configuration that enables the projection system 1 according to this example embodiment, and does not limit the scope of the present invention. A projection program for causing a computer to execute processing on the projection system 1 according to this example embodiment is also included in the scope of the present invention. A program recording medium recording the projection program according to this example embodiment is also included in the scope of the present invention.

[Operation]

Next, an operation of the projection system 1 according to this example embodiment will be described by using a flowchart illustrated in FIG. 9.

First, the projection device 10 projects projection light in the projection area in accordance with control by the control device 30 (a step S11).

The imaging device 20 captures an image of the imaging area including the projection area, and outputs image information generated from imaging data to the control device 30 (a step S12).

The control device 30 analyzes the image information acquired from the imaging device 20, and detects a change in the projection area (a step S13).

When the control device 30 does not detect a change in the projection area (No in a step S14), the processing returns to the step S11.

When the control device 30 detects a change in the projection area (Yes in the step S14), the control device 30 executes safety control (a step S15).

Figure 9:
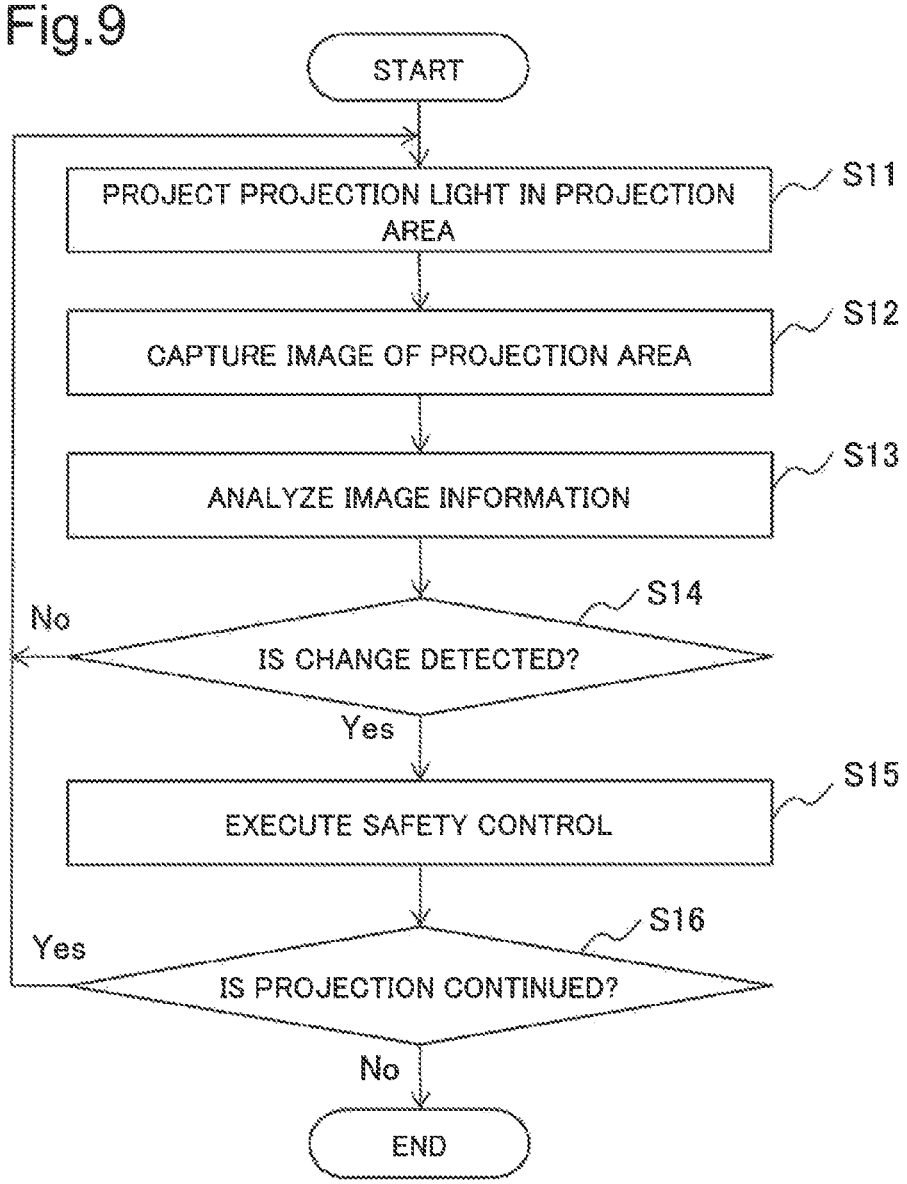
FIG. 9 is a flowchart illustrating an operation of the projection system according to the first example embodiment of the present invention.

When the projection is continued (Yes in a step S16), the processing returns to the step S11 to continue the processing along the flowchart illustrated in FIG. 9. On the other hand, when the projection is not continued (No in the step S16), the processing along the flowchart illustrated in FIG. 9 is terminated.

Examples of Application

Examples of application of the projection system 1 according to this example embodiment will now be described by using FIGS. 10 to 16.

Figure 10:
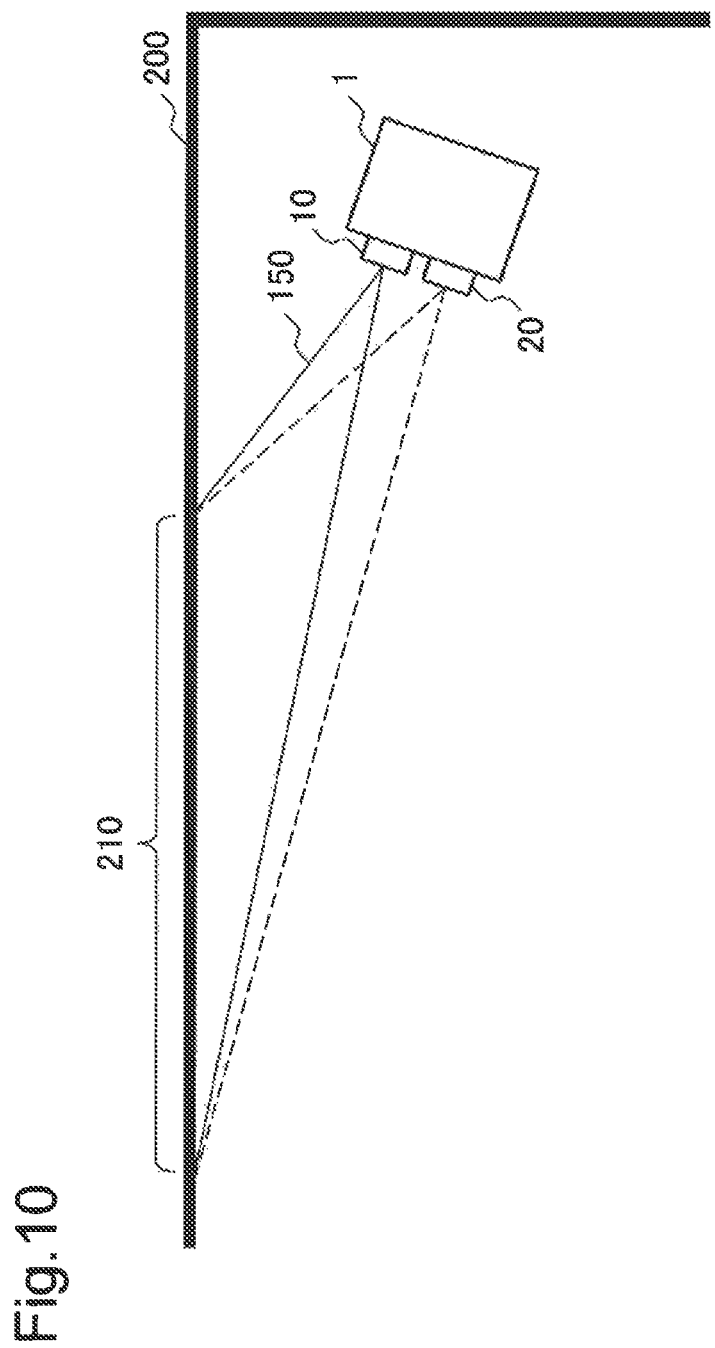
FIG. 10 is a conceptual diagram illustrating an example in which the projection system according to the first example embodiment of the present invention projects projection light in a projection area and captures an image.

FIG. 10 is a diagram illustrating that the projection system 1 projects projection light toward the projection area 210 of a projected surface 200, such as a ceiling or wall, and captures an image of the projection area 210. Note that FIG. 10 illustrates that a part of the projection device 10 and a part of the imaging device 20 project from the main body of the projection system 1. In FIG. 10, a solid line represents a projection angle of view, and a broken line represents an imaging angle of view.

Figure 11:
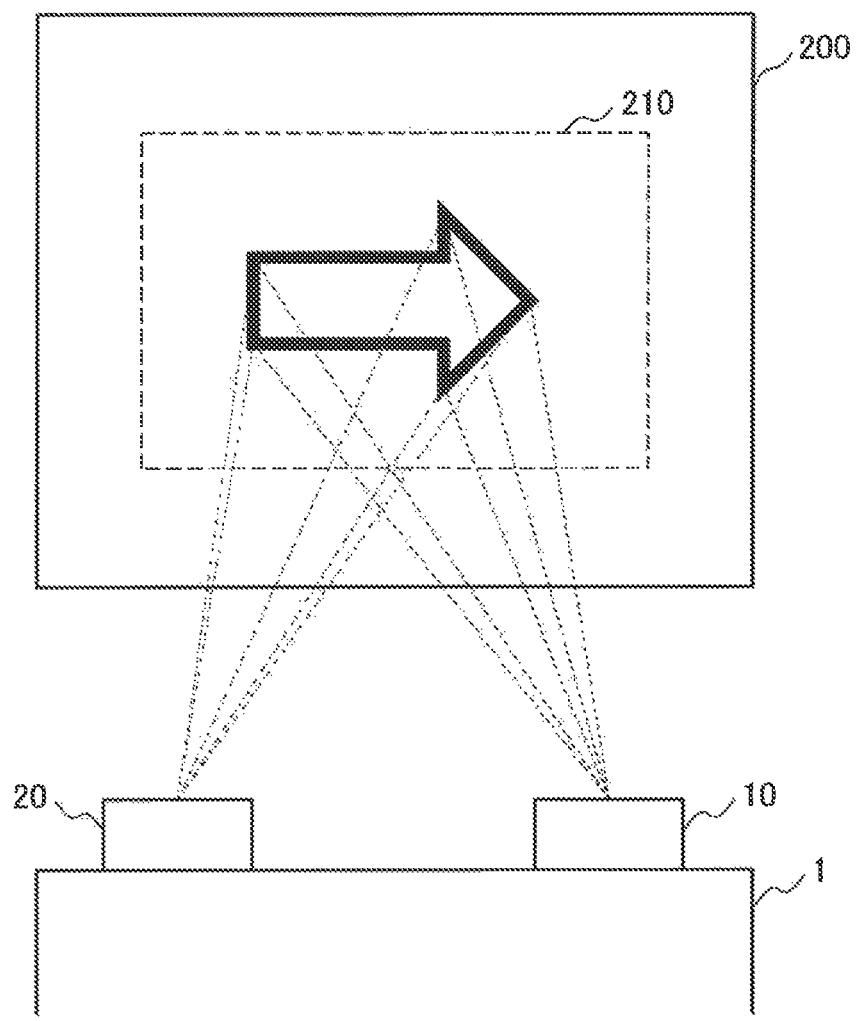
FIG. 11 is a diagram illustrating an example of display information normally projected by the projection system according to the first example embodiment of the present invention.

FIG. 11 illustrates an example of display information (indicated by a rightward arrow) to be displayed when the projection area 210 is normal. In FIG. 11, the display information displayed in the projection area 210 is normally displayed.

Figure 12:
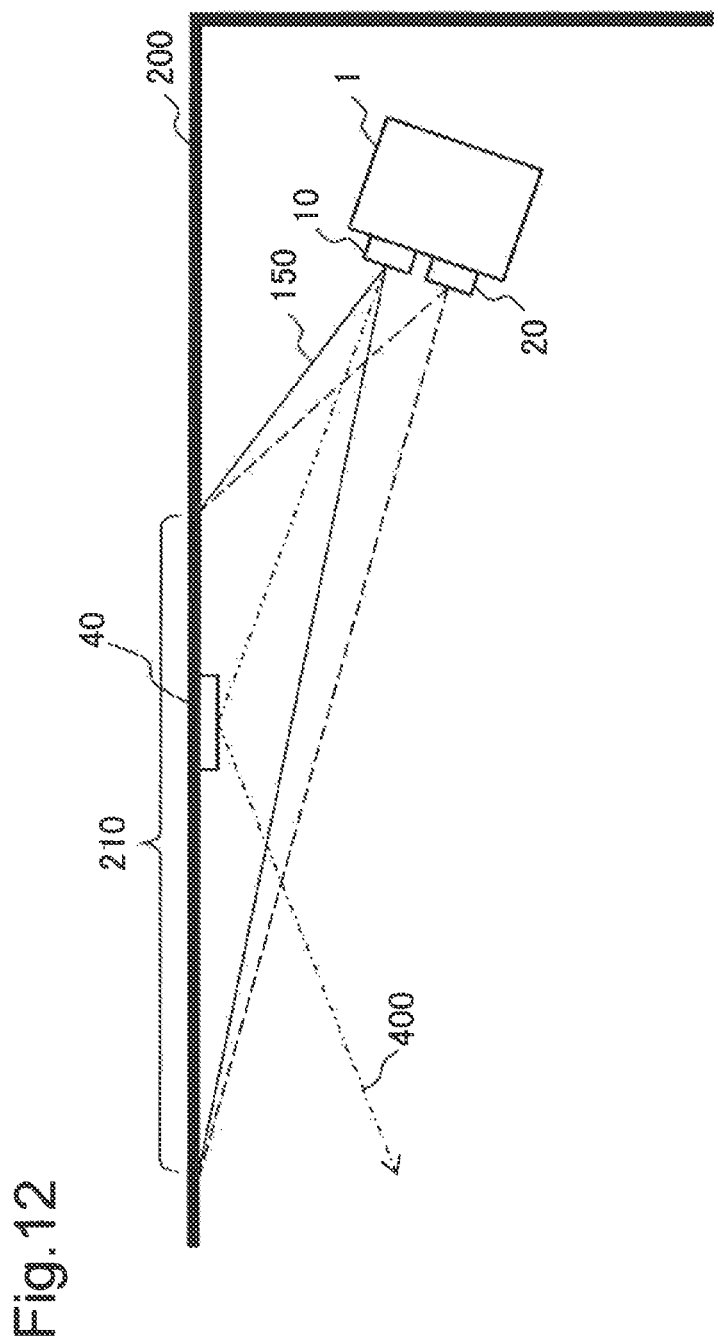
FIG. 12 is a conceptual diagram illustrating an example in which light is reflected by a reflector located in the projection area in which projection light is projected by the projection system according to the first example embodiment of the present invention.

FIG. 12 is a diagram illustrating an example in which when a reflector 40 with a high reflectance is located in the projection area 210, a part of the projection light 150 is reflected as reflected light 400 in an unintended direction deviated from the projection area 210. When the reflector 40 is located on the ceiling as illustrated in FIG. 12, light reflected by the reflector 40 may travel to an area in which a person walks. In this case, when the projection light 150 is continuously projected, the reflected light 400 can enter eyes of a user.

Figure 13:
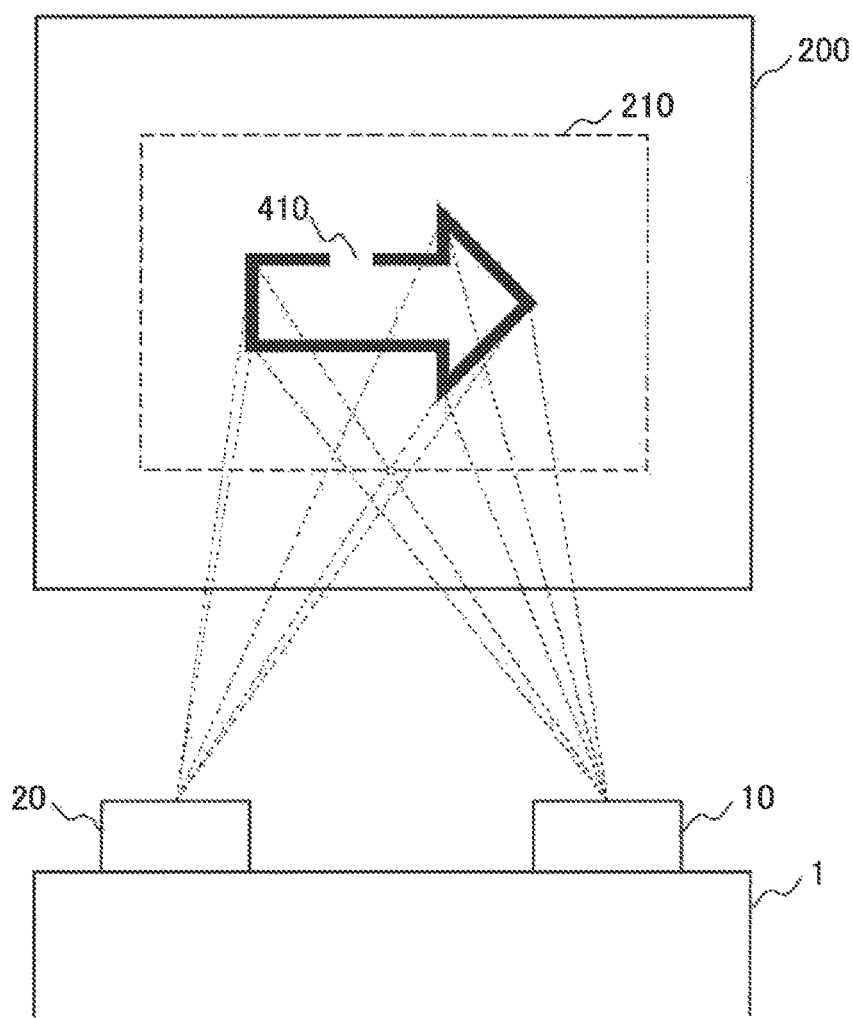
FIG. 13 is a conceptual diagram illustrating an example in which an abnormality is detected in the display information projected by the projection system according to the first example embodiment of the present invention.

FIG. 13 illustrates an example of display information (indicated by a rightward arrow) to be displayed when the reflector 40 is located in the projection area 210. In FIG. 13, a defect area 410 is displayed in a part of the display information displayed in the projection area 210. The defect area 410 illustrated in FIG. 13 corresponds to the position of the reflector 40. The display information displayed in the projection area 210 illustrated in FIG. 13 should be determined to be abnormal.

The control device 30 compares the display information in the normal state illustrated in FIG. 11 with the display information in the abnormal state illustrated in FIG. 13. When the control device 30 detects a change in the display information, the control device 30 executes safety control.

Figure 14:
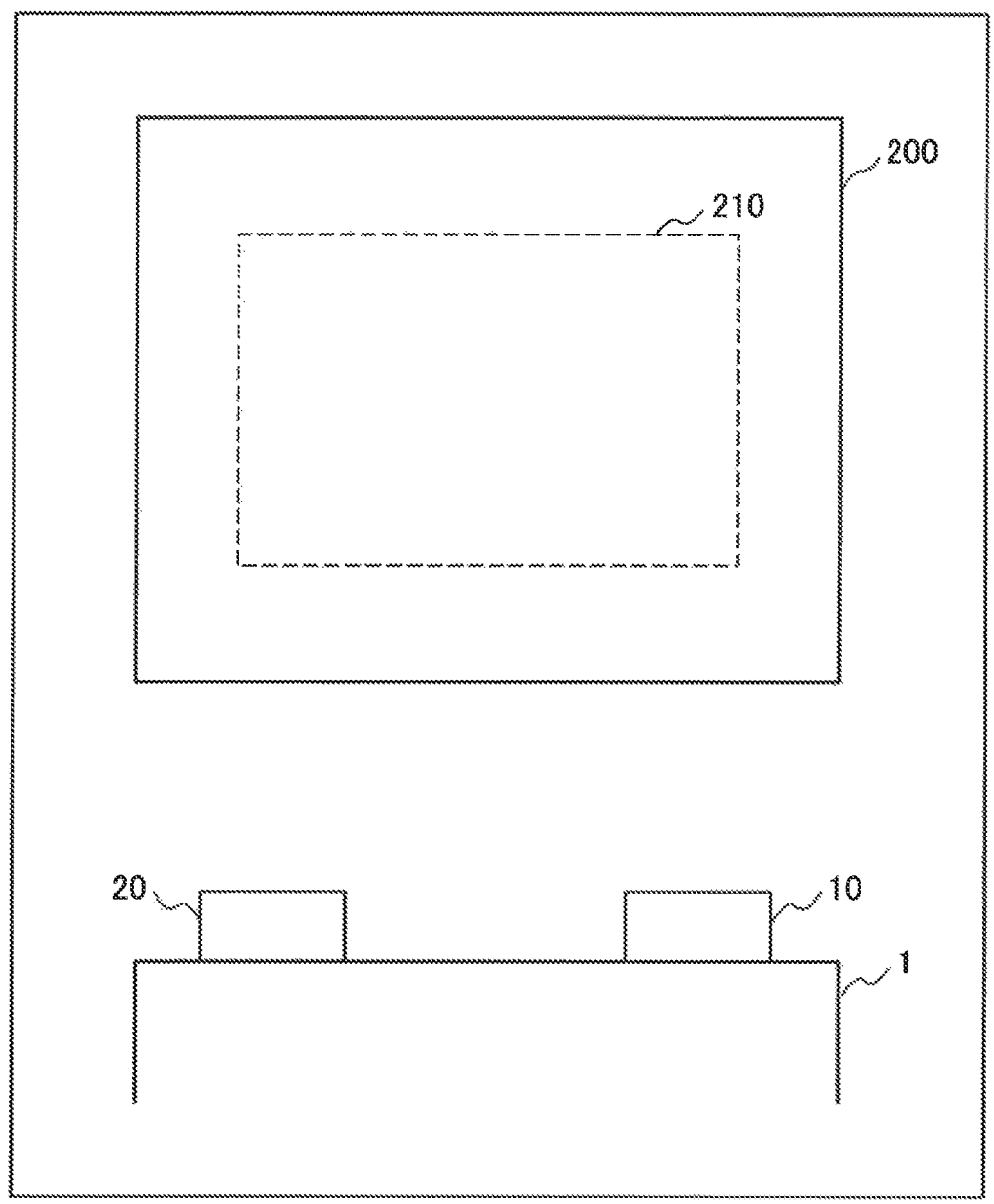
FIG. 14 is a conceptual diagram illustrating an example of safety control by the projection system according to the first example embodiment of the present invention.

For example, the control device 30 executes safety control to stop the projection of light from the projection device 10 as illustrated in FIG. 14.

Figure 15:
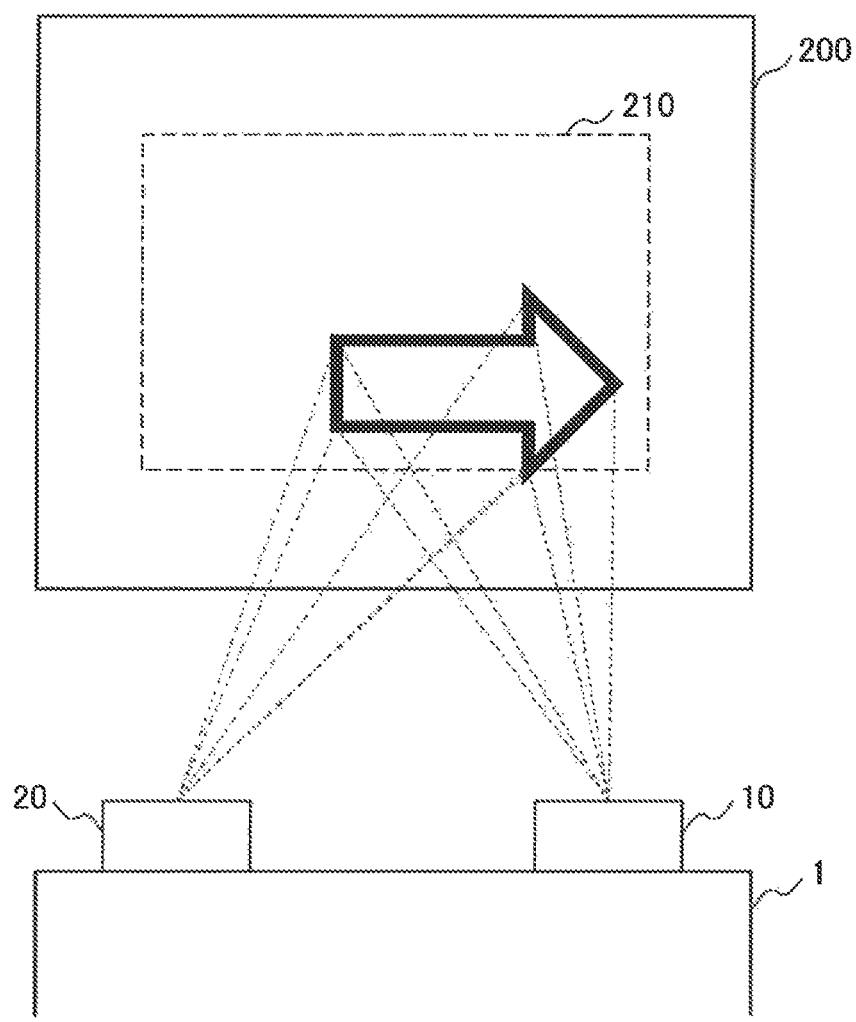
FIG. 15 is a diagram illustrating another example of safety control by the projection system according to the first example embodiment of the present invention.

For example, as illustrated in FIG. 15, the control device 30 executes safety control to shift the display position of the display information to be displayed in the projection area 21 from the position of the reflector 40.

Figure 26:
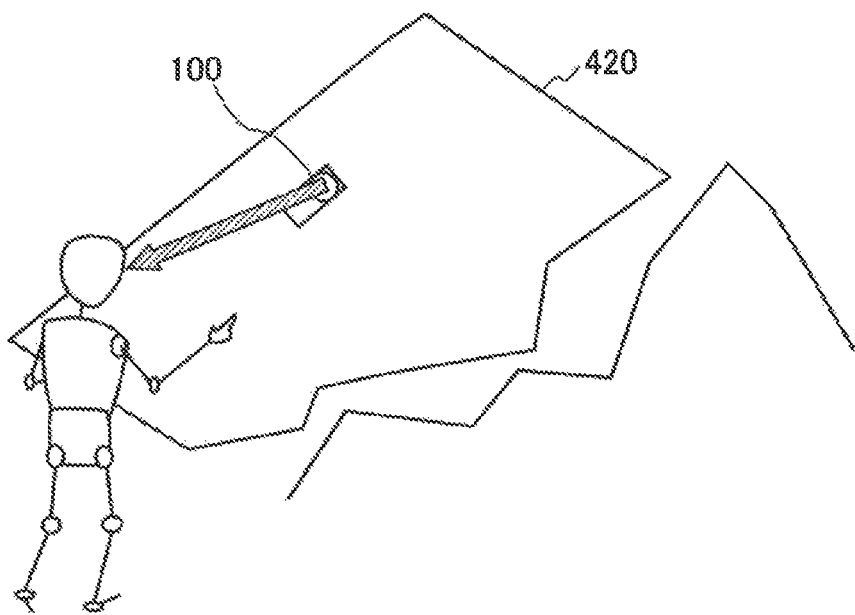
FIG. 26 is a conceptual diagram illustrating an example in which projection light is continuously projected when a wall surface in which a general projector is installed is collapsed.

For example, the projection system 1 according to this example embodiment can be downsized to such a degree that the projection system can be driven by a battery. Accordingly, even when a power outage occurs at the time of disaster, the projection system 1 can be continuously driven for a long period of time by the power of the battery. If light is continuously projected when the location in which the projection system 1 is installed is collapsed as illustrated in FIG. 26, it may be a source of harmful rays. In the situation as illustrated in FIG. 26, the projection system 1 according to this example embodiment can determine that there is an abnormality in the projection area and execute safety control to stop the projection of light. Therefore, even in the situation as illustrated in FIG. 26, the projection system 1 according to this example embodiment does not continuously project harmful rays.

Figure 16:
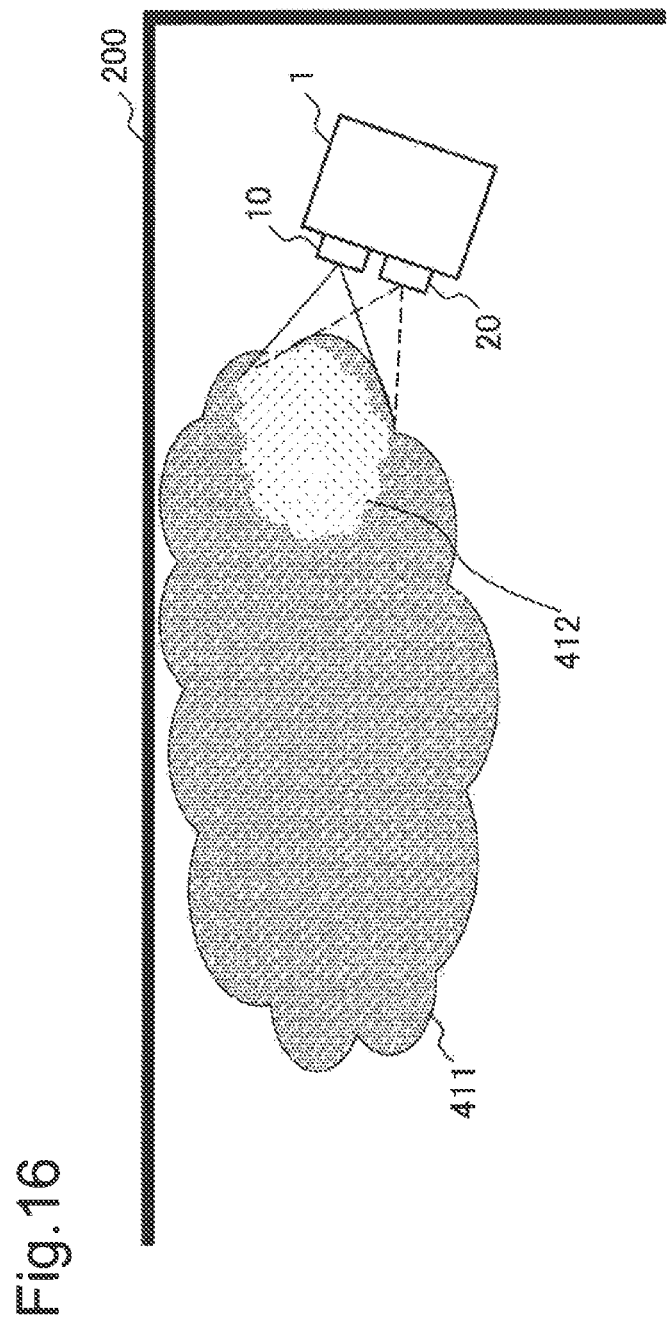
FIG. 16 is a conceptual diagram illustrating an example in which light is projected toward smoke by the projection system according to the first example embodiment of the present invention.

FIG. 16 illustrates an example of display information 412 displayed on smoke 411 when the smoke 411 is filled in the projection direction of the projection system 1 due to fire or the like occurring in a facility. When the state as illustrated in FIG. 16 continues, the display information is displayed at an erroneous position, which may provide the user who takes shelter with erroneous information.

When the situation as illustrated in FIG. 16 has occurred, the display information 412 displayed on the smoke 411 is different from the display information displayed in the projection area before the smoke 411 is generated, and thus the projection system 1 according to this example embodiment determines that there is an abnormality in the projection area and executes safety control.

As described above, according to the projection system of this example embodiment, it is possible to provide a projection system capable of safely projecting a desired projection image in any projection area. Even when the reflector is located in the projection area, the projection system according to this example embodiment does not cause the reflector to continuously reflect light in an unintended direction. Accordingly, the projection system according to this example embodiment can safely project a desired projection image in any projection area.

Second Example Embodiment

Figure 17:
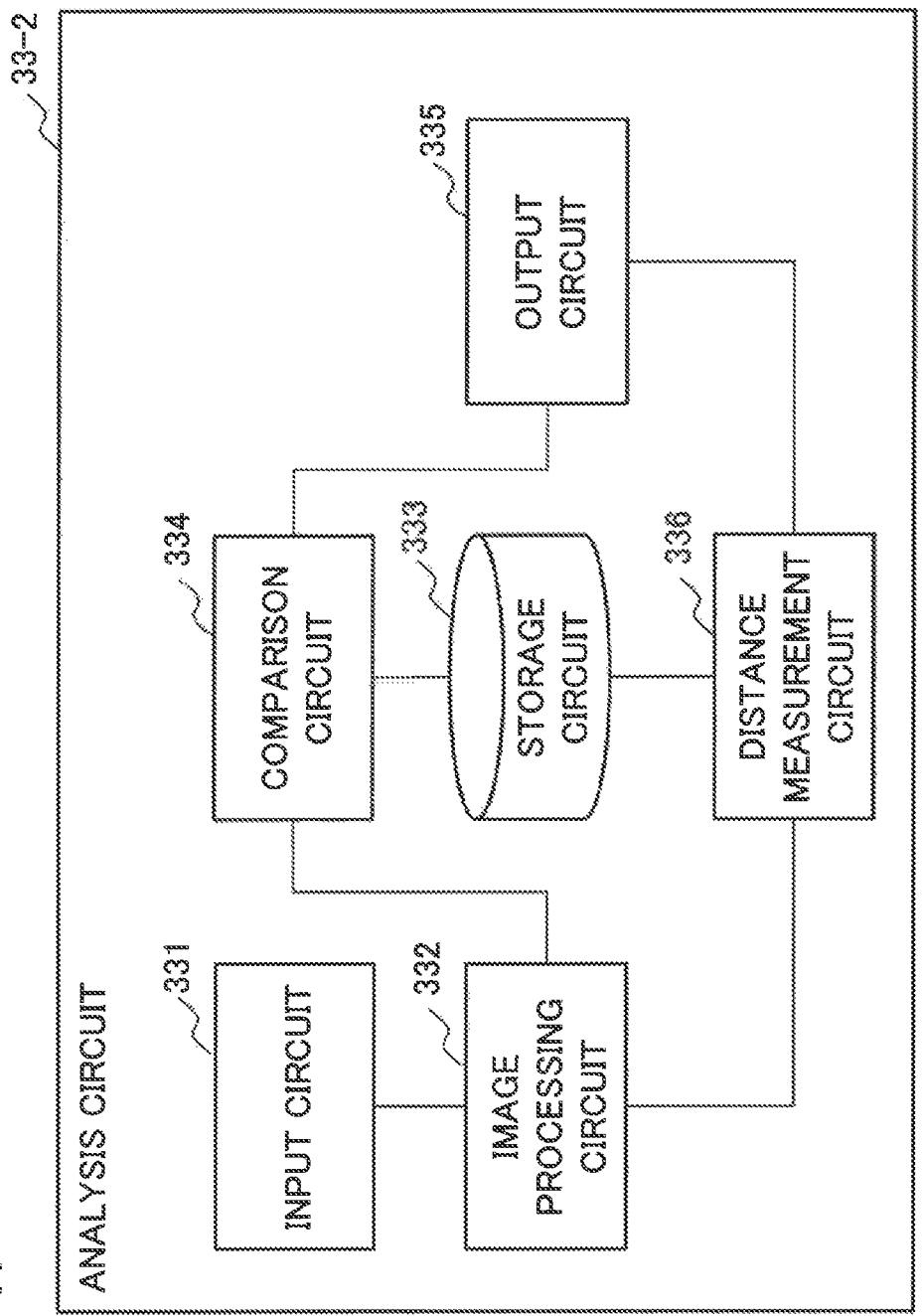
FIG. 17 is a block diagram illustrating a configuration of an analysis circuit included in a control device of a projection system according to a second example embodiment of the present invention.

Next, a projection system 2 according to a second example embodiment of the present invention will be described with reference to the drawings. FIG. 17 is a block diagram illustrating a configuration of an analysis circuit 33-2 included in the projection system 2 according to this example embodiment. In the projection system 2 according to this example embodiment, a distance measurement circuit 336 is added to the analysis circuit 33 of the projection system 1 according to the first example embodiment. Note that a configuration of the projection system 2 is similar to that of the projection system 1, except for the analysis circuit 33-2, and thus descriptions thereof are omitted. In the following description, a control device including the analysis circuit 33-2 is referred to as the control device 30.

As illustrated in FIG. 17, the analysis circuit 33-2 includes a distance measurement circuit 336 in addition to the input circuit 331, the image processing circuit 332, the storage circuit 333, the comparison circuit 334, and the output circuit 335. The distance measurement circuit 336, which is the difference from the first example embodiment, will be described below.

The distance measurement circuit 336 includes a function of measuring a distance between the projection system 2 and the projection area. For example, the distance measurement circuit 336 measures the distance, based on the principle of the triangulation method. The projection system 2 performs triangulation by using the difference between the position of the projection device 10 and the position of the imaging device 20, and measures the distance or inclination to the projected surface 200 that forms the projection area 210. Further, the projection system 2 performs image distortion correction, based on the measured distance or inclination.

Figure 18:
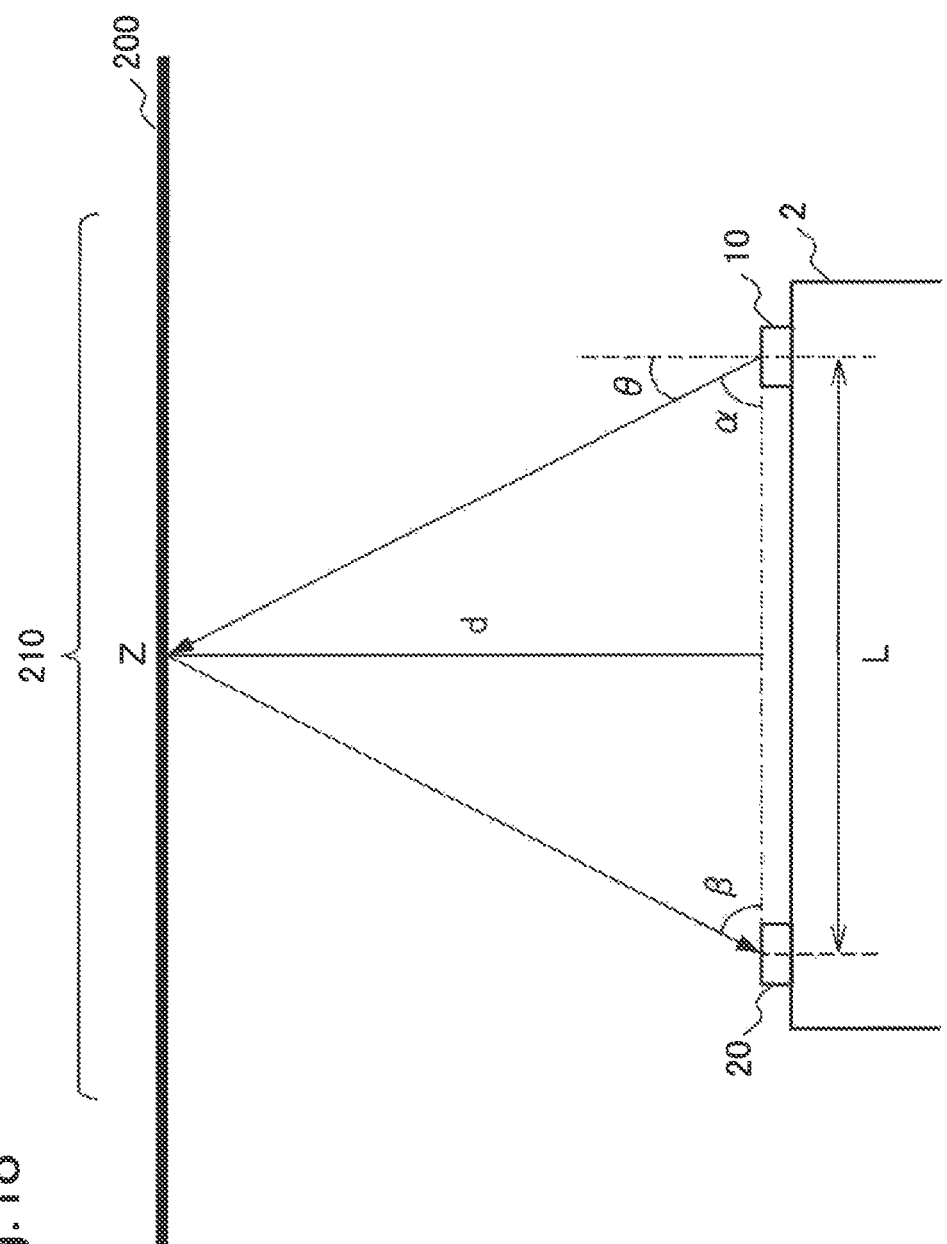
FIG. 18 is a diagram for explaining that the projection system according to the second example embodiment of the present invention measures a distance, based on the principle of triangulation.

FIG. 18 is a diagram for explaining an example of measuring a distance between the projection system 2 and the projection area 210, based on the principle of the triangulation method.

For example, when the projection system 2 is installed, spot light or slit light is projected toward the projected surface 200 from the projection system 2. It is assumed in FIG. 18 that a dot-like or linear pattern is displayed at a position indicated by Z.

A projection angle $\theta$ of the projection device 10 can be arbitrarily set. Accordingly, an angle $\alpha$ ($=\pi/2-\theta$), which is an angle formed between a straight line connecting the projection device 10 and Z and a straight line connecting the projection device 10 and the imaging device 20, is known. An angle $\beta$, which is an angle formed between a straight line connecting the imaging device 20 and Z and a straight line connecting the projection device 10 and the imaging device 20, is acquired from a light receiving position of an imaging element 22 of the imaging device 20. A distance L between the projection device 10 and the imaging device 20 is a fixed value of the projection system 2.

A distance d between the projection system 2 and the projected surface 200 can be acquired by the following formula 1 by using the parameters described above.

$$d = \frac{L \times \sin\alpha \sin\beta}{\sin(\alpha + \beta)} \qquad (1)$$

Practically, a displacement y from an image center line of spot light (slit light) on an imaging plane of the imaging device 20 is measured, and a distance d between the projection system 2 and the projected surface 200 can be acquired from the following formula 2 by using a focal distance f of the imaging device 20 and the projection angle $\theta$ of the projection device 10.

$$\frac{f \times L}{y + f \times \tan\theta} \qquad (2)$$

Note that in the case of measuring the distance based on the principle of triangulation, a method other than Formula 1 and Formula 2 may be used.

The distance between the projection system 2 and the projected surface 200 is preferably measured at several locations, instead of measuring the distance only at one location. For example, if distances between the projection system 2 and vicinities of four corners of the projection area 210 are measured, the distortion of the entire projection area 210 can be measured. If there is a location where display information is frequently displayed, a change in distance can be easily detected by measuring the distance between the location and the projection system 2.

Although a timing when the distance is measured can be arbitrarily set, the timing is preferably set to a predetermined timing. For example, during a period in which display information is displayed, the distance measurement may be executed by irradiating spot light with a pulse width that cannot be visually recognized at a predetermined time interval. Further, for example, the distance measurement may be executed at a timing when it is determined that there is an abnormality in the projection area 21. Alternatively, the distance measurement may be executed at a time when the determination result indicating that the projection area 210 is normal is output by a predetermined number of times.

The distance measurement circuit 336 accumulates data on the measured distance in the storage circuit 333 as three-dimensional information about the projection area 210. Specifically, the distance measurement circuit 336 measures a distance between the projection system 2 and a specific location in the projection area 210 and accumulates the three-dimensional information about the projection area 210 in the storage circuit 333. The projection control circuit 37 performs control to cause the display unit of the spatial light modulation element 13 to display a pattern in which display information with no distortion is displayed in the projection area 210, based on the accumulated three-dimensional information about the projection area 210.

The control device 30 detects a change in the projection area 210 by comparing the accumulated three-dimensional information about the projection area 210.

Figure 19:
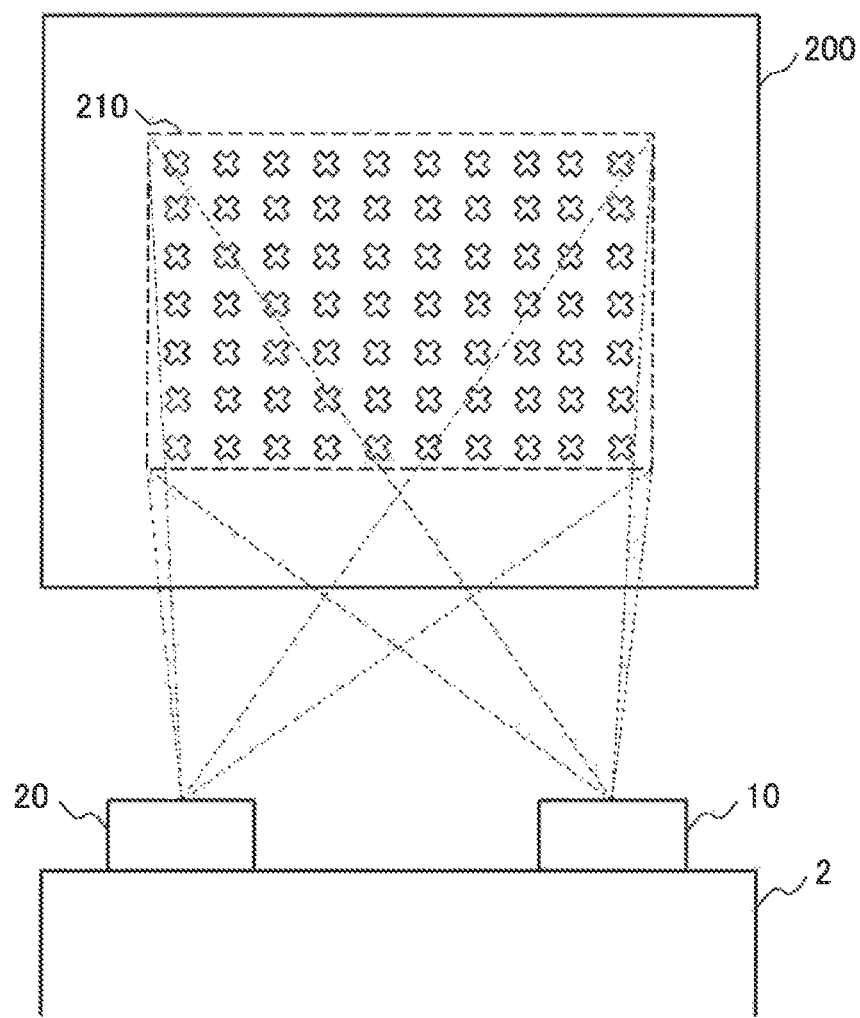
FIG. 19 is a diagram for explaining that the projection system according to the second example embodiment of the present invention measures a distance by using a pattern arranged in an array.

The projection system 2 may measure the distance or distortion by using a method other than the triangulation. FIG. 19 illustrates an example in which display information (an alignment pattern) in which a plurality of marks (x) are arranged in an array is displayed in the projection area 210 of the projected surface 200, and a distance between the projected surface 200 and the projection system 2, or a distortion is measured by using the alignment pattern.

For example, as illustrated in FIG. 19, the projection system 2 projects the alignment pattern to the projected surface 200 when the system is installed, and captures an image of the alignment pattern projected to the projected surface 200. Each of the marks that form the alignment pattern is projected with a different projection angle from the projection device 10. The control device 30 measures a displacement of each mark with respect to the image center line by using image information generated by the imaging device 20, and calculates a distance between the projection system 2 and the position indicated by each mark by using the formula 2. The control device 30 stores these distances as a pattern for calibration. According to the method illustrated in FIG. 19, distances between the projection system 2 and a plurality of points on the projected surface 200 can be measured at once.

A change over time in the distance between the projection system 2 and the projected surface 200 may be measured at a predetermined timing. The projection system 2 projects the alignment pattern to the projection area 210 at a predetermined timing, and compares the difference from the pattern for calibration. When the control device 30 does not detect a difference between the pattern for calibration and a newly projected alignment pattern, the control device 30 determines that the projection area is normal. When the control device 30 does not detect a difference between the pattern for calibration and the newly projected alignment pattern, the control device 30 determines that there is an abnormality in the projection area 210, and the control device 30 may execute safety control.

Figure 20:
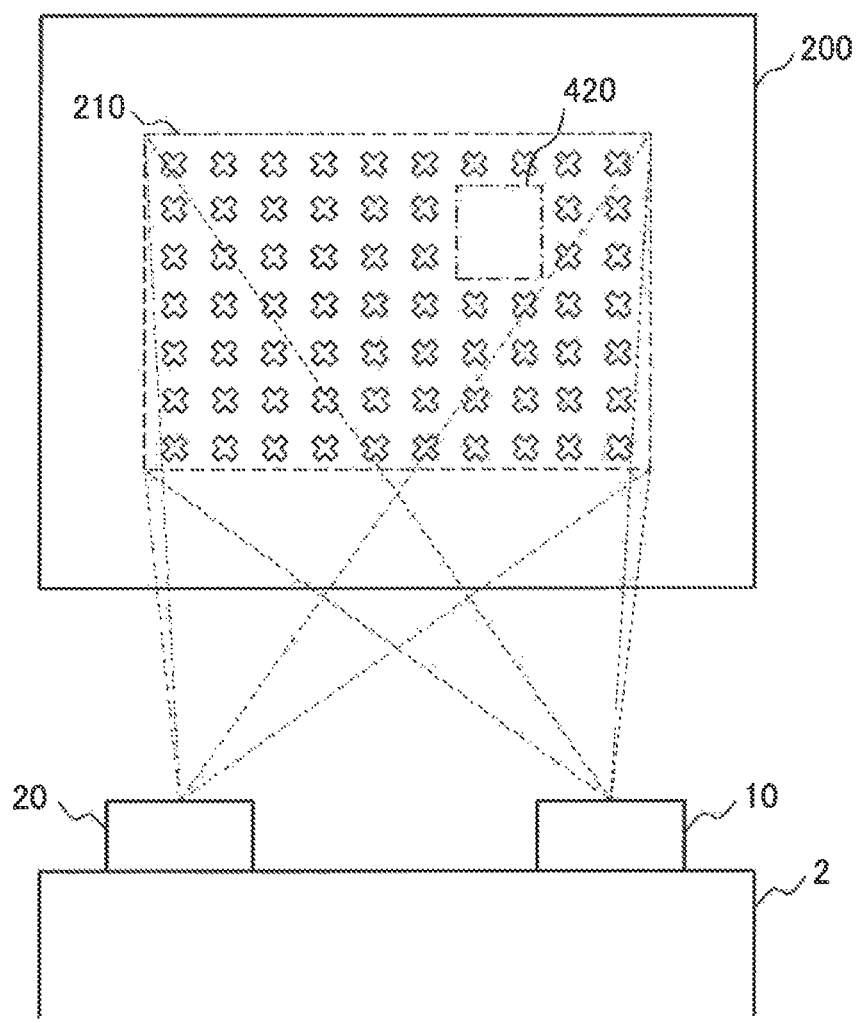
FIG. 20 is a diagram for explaining an example in which the projection system according to the second example embodiment of the present invention detects an abnormality by using a projected pattern.

Further, an abnormality in the projection area 210 can be detected by using the alignment pattern. FIG. 20 illustrates an example in which a reflector is detected by using the alignment pattern. When the reflector is located in the projection area 210, the position is detected as a defect area 420 of the mark. When the control device 30 detects the defect area 420, the control device 30 may execute safety control.

[Operation]

Next, an operation of the projection system 2 according to this example embodiment will be described by using a flowchart illustrated in FIG. 21.

First, the projection device 10 projects projection light in the projection area 210 in accordance with control by the control device 30 (a step S21).

The imaging device 20 captures an image of the imaging area including the projection area 210, and outputs image information generated from imaging data to the control device 30 (a step S22).

The control device 30 analyzes the image information acquired from the imaging device 20, and detects a change in the projection area 210 (a step S23).

The control device 30 measures the distance between the projection system 2 and a specific location in the projection area 210 (a step S24). Note that the processing in the step 24 need not be executed every time, but instead may be executed at a predetermined timing.

When the control device 30 does not detect a change in the distance (No in a step S25), the processing returns to the step S21.

When the control device 30 detects a change in the distance (Yes in the step S25), the control device 30 executes safety control (a step S26).

Figure 21:
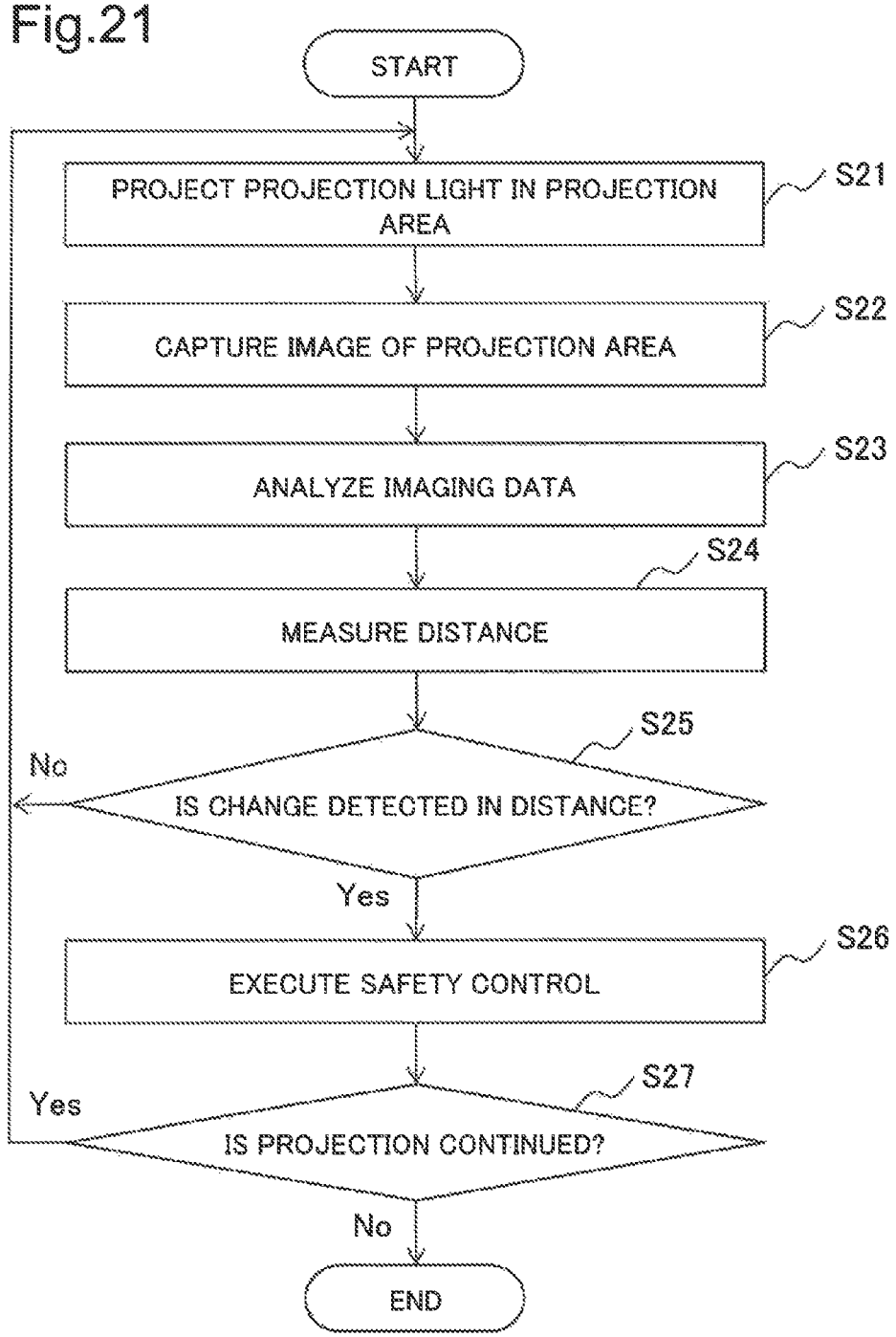
FIG. 21 is a flowchart illustrating an operation of the projection system according to the second example embodiment of the present invention.

When the projection is continued (Yes in a step S27), the processing returns to the step S21 to continue processing along the flowchart illustrated in FIG. 21. On the other hand, when the projection is not continued (No in the step S27), the processing along the flowchart illustrated in FIG. 21 is terminated.

However, the processing illustrated in FIG. 21 is an example of the operation of the projection system 2 according to this example embodiment, and the operation of the projection system 2 is not limited to this.

As described above, according to this example embodiment, the distances between the projection system and a plurality of locations on the projected surface are measured, and a change in the projected surface is monitored and three-dimensional information about the projected surface is accumulated, thereby making it possible to more reliably execute safety control.

Third Example Embodiment

Next, a projection system 3 according to a third example embodiment of the present invention will be described. The projection system 3 according to this example embodiment captures an image of a range including a detection area outside of a projection area, and executes safety control at a timing when a detection target detected in the detection area enters the projection area. A configuration of the projection system 3 according to this example embodiment is similar to that of the projection system according to the second example embodiment, and thus detailed descriptions thereof are omitted.

Figure 22:
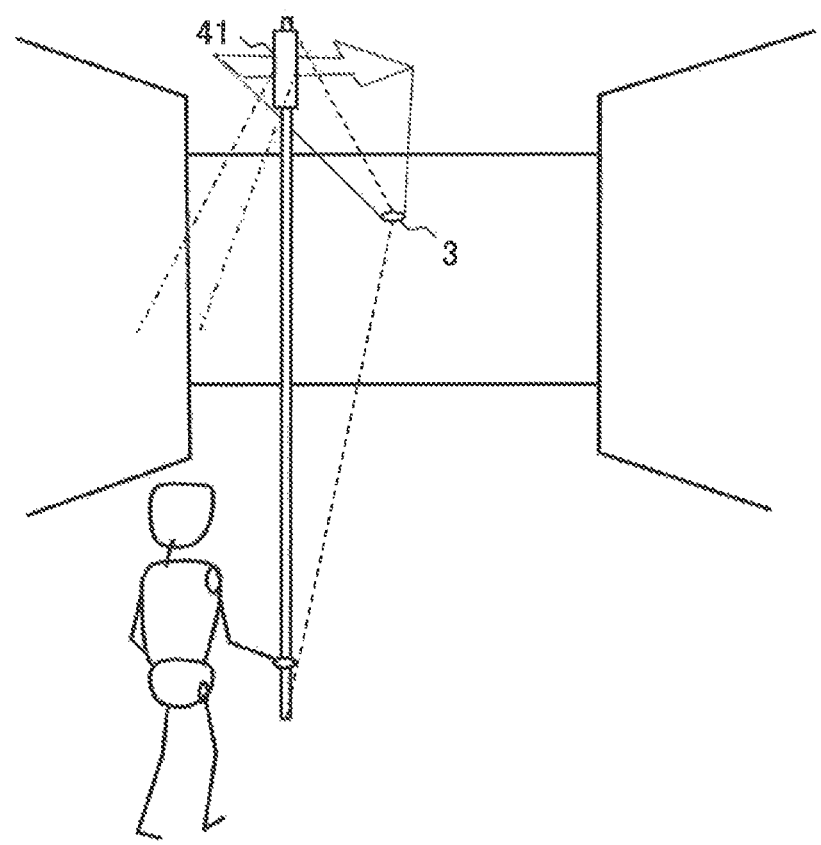
FIG. 22 is a conceptual diagram illustrating an example in which a reflector is incorporated in a projection range of projection light in a projection system according to a third example embodiment of the present invention.

FIG. 22 illustrates an example in which a user carries an object including a reflection unit 41 which is a detection target. FIG. 22 assumes a use situation in which the user carries an object which includes the reflection unit 41 with a high reflectance at a tip end or a part thereof, such as a ski or a spear.

In the example of FIG. 22, an arrow indicating a traveling direction for the user is displayed on a ceiling which is a projection area. When the reflection unit 41 enters the projection area, light can be reflected in an unintended direction, like in FIG. 12.

The projection system 3 according to this example embodiment captures an image of not only the projection area, but also an area in which the user passes, as a detection area. The projection system 3 captures an image of a range including the reflection unit 41, and recognizes a positional relationship between the reflection unit 41 and the projection area. For example, the projection system 3 may irradiate spot light with a short pulse width in the vicinity of the reflection unit 41 after the time when the reflection unit 41 is detected, measure the distance from reflected light of the spot light to the reflection unit 41, and calculate the positional relationship with the projection area.

Figure 23:
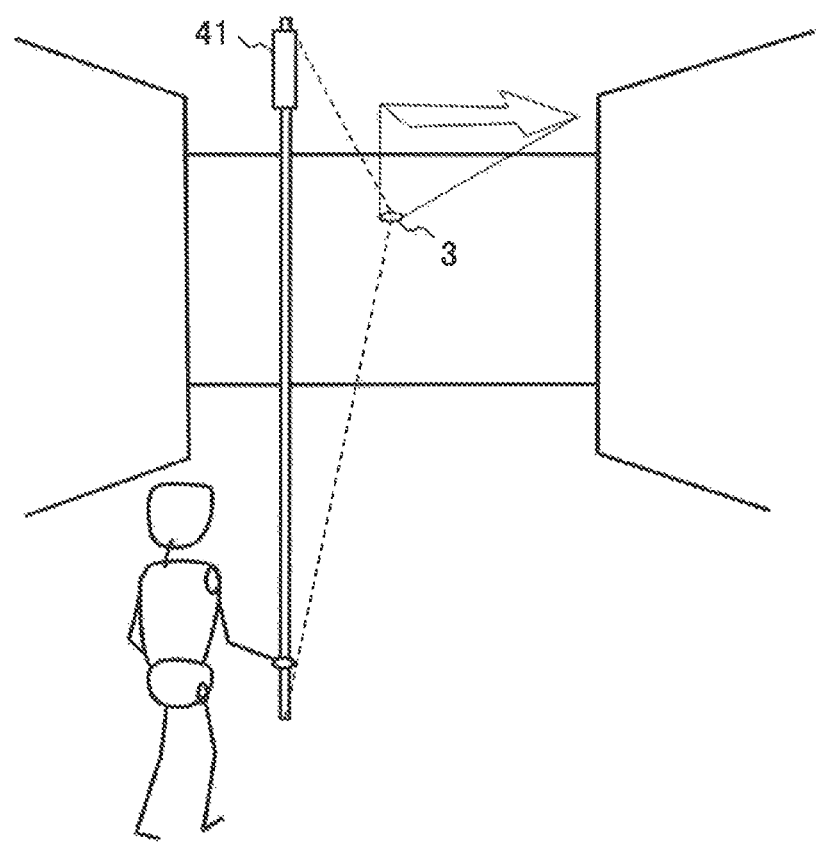
FIG. 23 is a conceptual diagram illustrating an example in which the projection system according to the third example embodiment of the present invention shifts a projection direction of projection light.

The projection system 3 performs control to display an arrow illustrated in FIG. 23 by shifting the display position of the arrow at a timing when the reflection unit 41 enters the projection area. By the control, even when the reflection unit 41 enters the projection area, no light is irradiated on the reflection unit 41. Note that when the reflection unit 41 is large, the display of display information may be stopped to verify, based on spot light, whether the reflection unit 41 enters the projection area.

[Operation]

Next, an operation of the projection system 3 according to this example embodiment will be described by using a flowchart illustrated in FIG. 24.

First, the projection device 10 projects projection light in the projection area in accordance with control by the control device 30 (a step S31).

The imaging device 20 captures an image of the imaging area including the detection area, and outputs image information generated from the imaging data to the control device 30 (a step S32).

The control device 30 analyzes the image information acquired from the imaging device 20, and detects a change in the detection area (a step S33).

When the control device 30 does not detect a reflector with a high reflectance (No in a step S34), the processing returns to the step S31.

When the control device 30 detects a reflector (Yes in the step S34), the control device 30 measures the distance from the reflector, and calculates the positional relationship between the projection area and the reflector (a step S35).

When the control device 30 determines that the reflector is not present in the projection area (No in a step S36), the processing returns to the step S34.

When the control device 30 determines that the reflector is present in the projection area (Yes in the step S36), the control device 30 executes safety control (a step S37).

Figure 24:
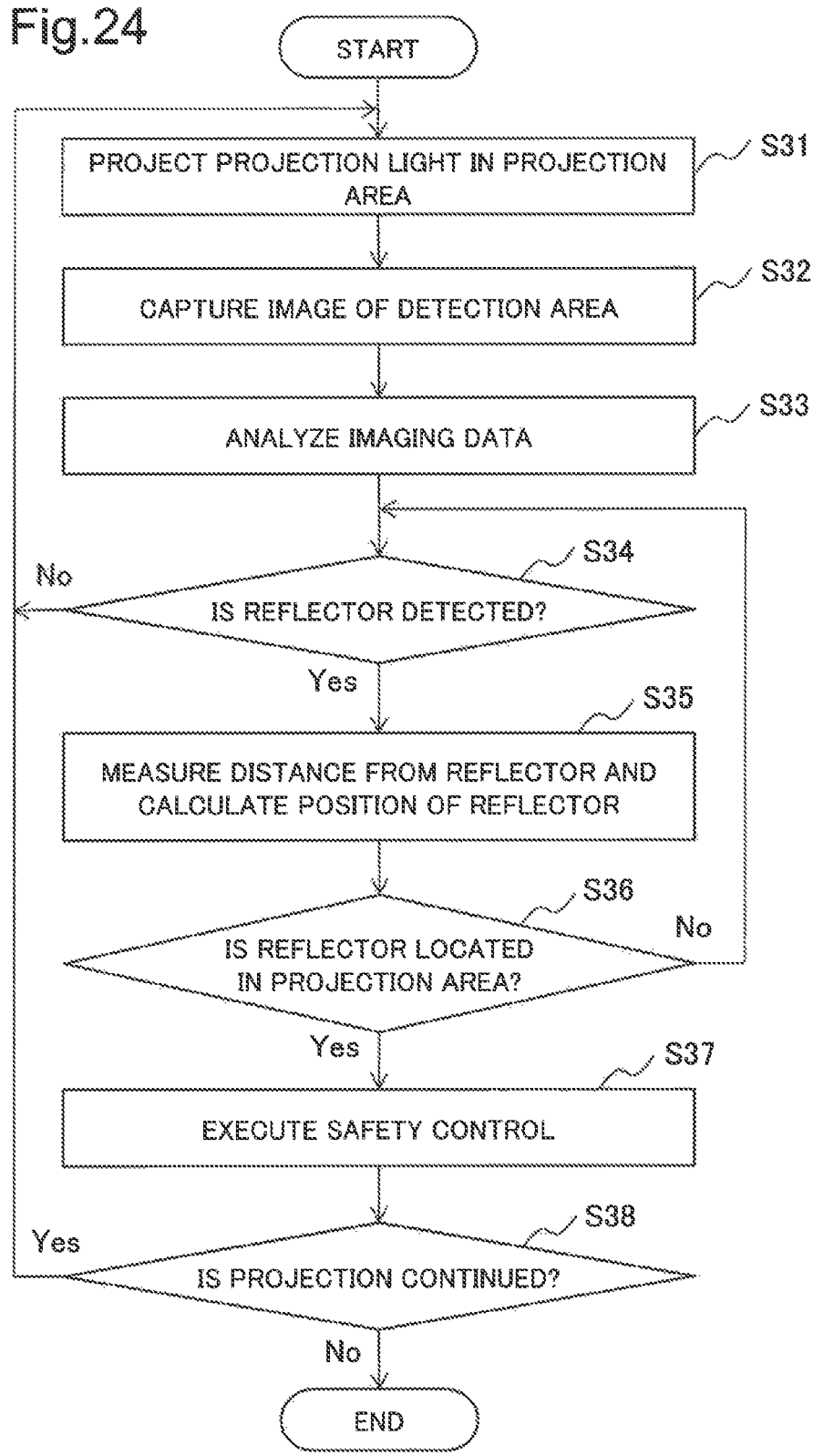
FIG. 24 is a flowchart illustrating an operation of the projection system according to the third example embodiment of the present invention.
Figure 25:
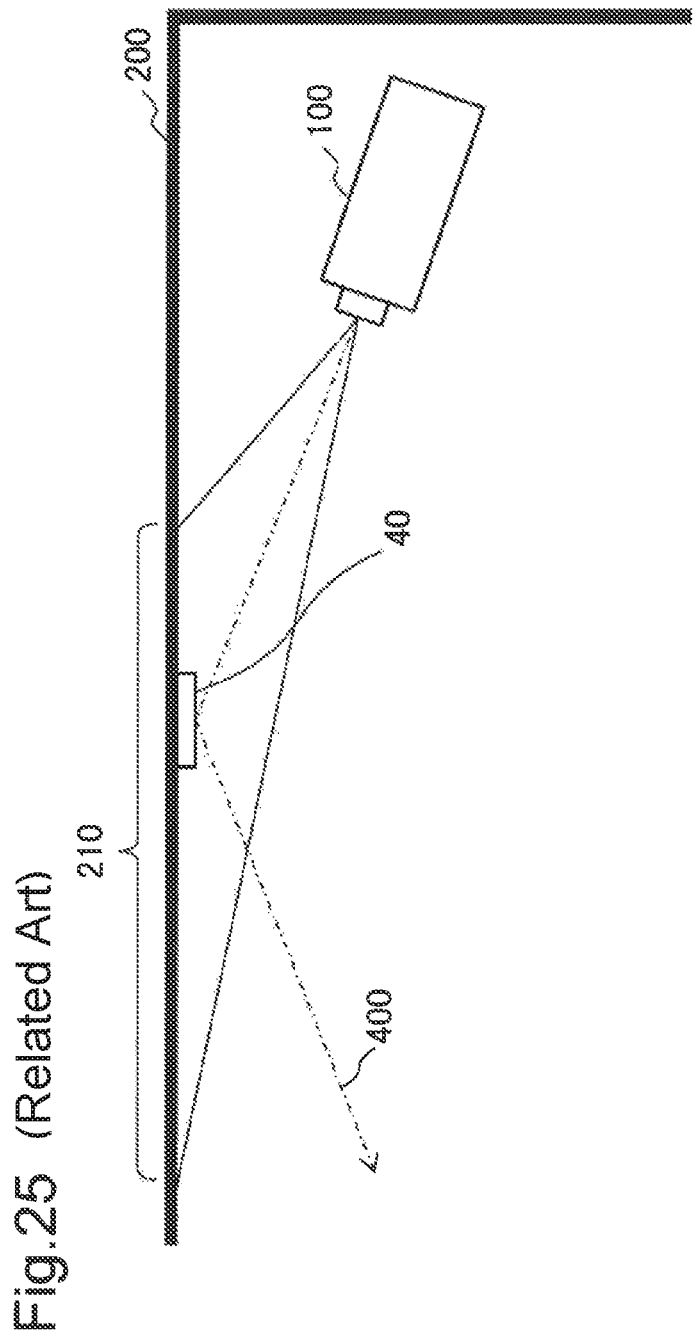
FIG. 25 is a conceptual diagram illustrating an example in which light is reflected by a reflector when projection light is projected by a general projector in a projection area in which the reflector is located.

When the projection is continued (Yes in a step S38), the processing returns to the step S31 to continue the processing along the flowchart illustrated in FIG. 24. On the other hand, when the projection is not continued (No in the step S38), the processing along the flowchart illustrated in FIG. 24 is terminated.

However, the processing illustrated in FIG. 24 is an example of the operation of the projection system 3 according to this example embodiment, and the operation of the projection system 3 is not limited to this.

As described above, the projection system according to this example embodiment can detect that an object with a high reflectance is approaching the projection area. Therefore, according to the projection system of this example embodiment, it is possible to more reliably perform safety control by the operation when the reflector enters the projection area.

Fourth Example Embodiment

Next, a projection system 4 according to a fourth example embodiment of the present invention will be described. The projection system 4 according to this example embodiment has a configuration in which a reflection unit is added to the projection system according to each of the example embodiments described above.

Figure 27:
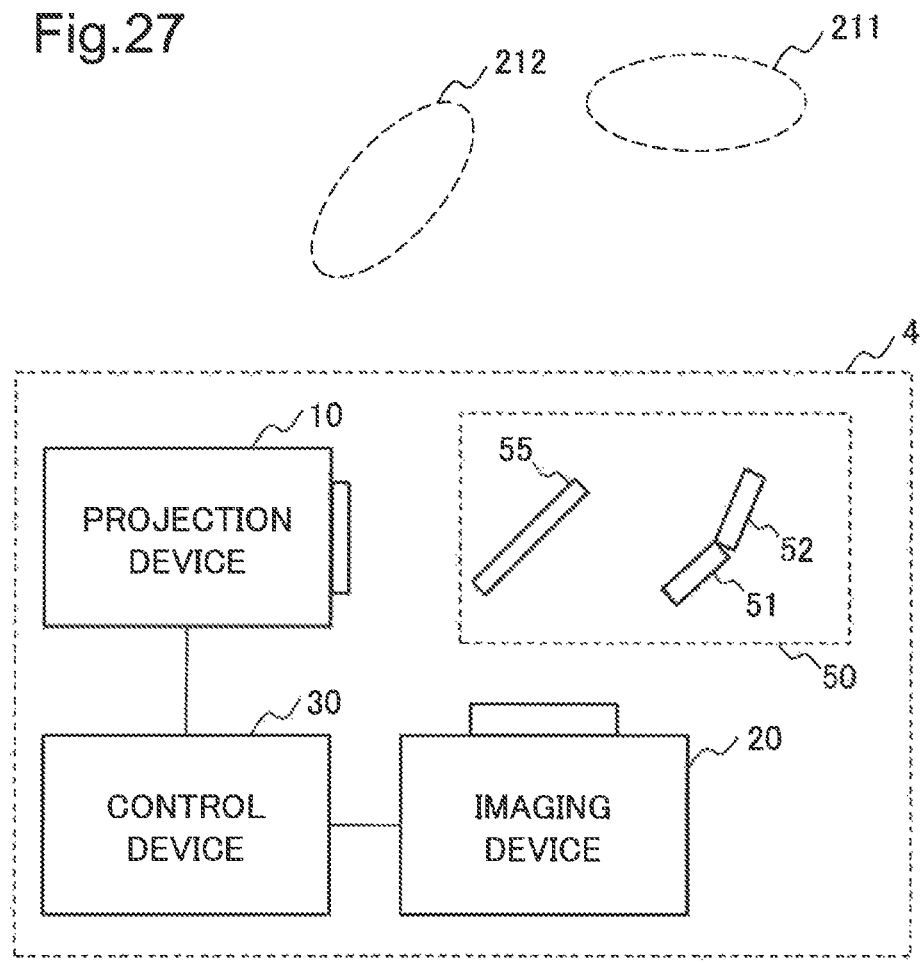
FIG. 27 is a conceptual diagram illustrating a configuration of a projection system according to a fourth example embodiment of the present invention.

FIG. 27 is a conceptual diagram illustrating the configuration of the projection system 4 according to this example embodiment. As illustrated in FIG. 27, the projection system 4 according to this example embodiment includes a reflection unit 50 in addition to the projection device 10, the imaging device 20, and the control device 30. Note that although this example embodiment illustrates an example in which projection light is projected toward two projection areas, it may be configured in such a way that projection light is projected toward three or more projection areas. In the case of projecting projection light toward three or more projection areas, reflecting mirrors may be provided by the number of projection areas, or it may be configured in such a way that projection light is reflected toward a plurality of reflection areas by a single reflecting mirror.

The reflection unit 50 includes a first reflecting mirror 51, a second reflecting mirror 52, and a half mirror 55. Note that the first reflecting mirror 51 and the second reflecting mirror 52 may or may not be integrated.

The first reflecting mirror 51 is disposed in such a way as to reflect projection light from the projection device 10 toward a first projection area 211. The second reflecting mirror 52 is disposed in such a way as to reflect the projection light from the projection device 10 toward a second projection area 212. Specifically, the projection system 4 includes a reflecting mirror that reflects the projection light from the projection device 10 toward a plurality of projection areas.

The half mirror 55 is disposed on the emission axis of the projection light projected from the projection device 10. It can also be expressed that the half mirror 55 is disposed between the projection device 10 and a plurality of reflecting mirrors. The half mirror 55 lets the projection light projected from the projection device 10 pass through. Further, the half mirror 55 is disposed in such a way that images of the first projection area 211 and the second projection area 212 are reflected by the first reflecting mirror 51 and the second reflecting mirror 52, respectively, and are guided to the imaging device 20. In other words, the half mirror 55 lets the projection light from the projection device 10 pass through, and reflects the images of the first projection area 211 and the second projection area 212, which are reflected by the first reflecting mirror 51 and the second reflecting mirror 52, respectively, toward the imaging device 20.

Figure 28:
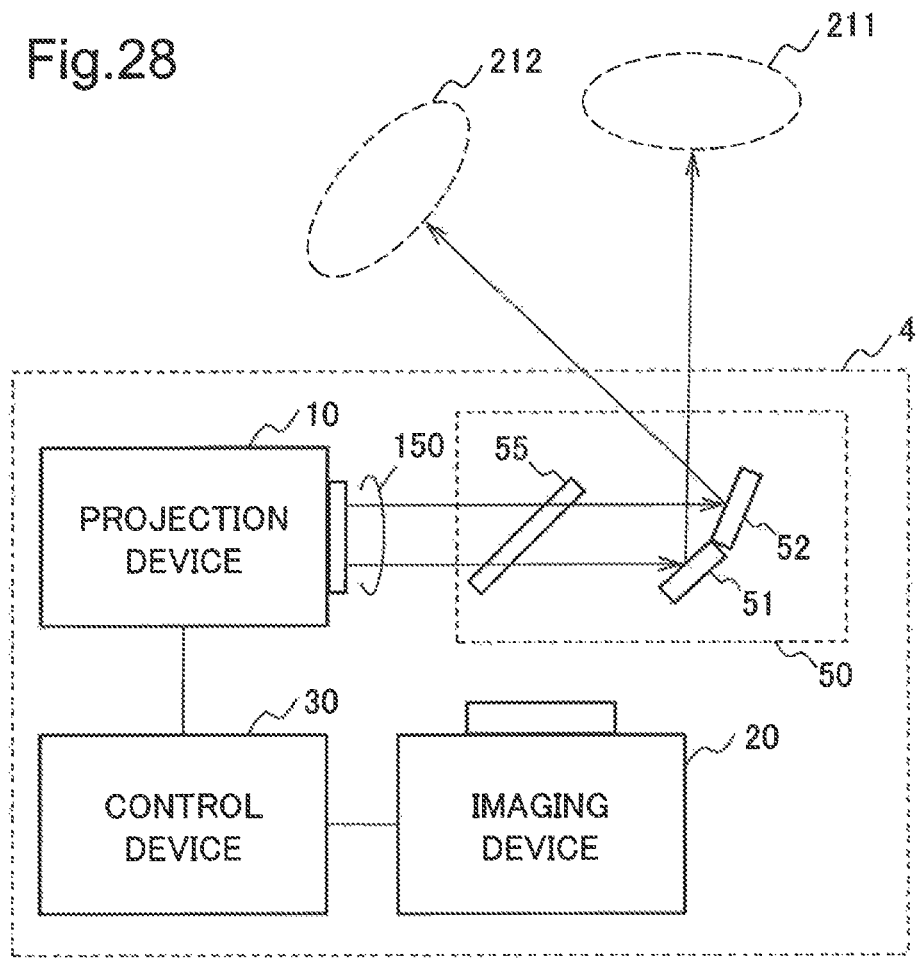
FIG. 28 is a conceptual diagram illustrating an example in which a plurality of reflecting mirrors included in the projection system according to the fourth example embodiment of the present invention reflects projection light toward a plurality of projection areas.

FIG. 28 is a conceptual diagram illustrating an example in which the projection light 150 projected from the projection device 10 is projected to the first projection area 211 and the second projection area 212 by the first reflecting mirror 51 and the second reflecting mirror 52, respectively. As illustrated in FIG. 28, the projection system 4 can project the projection light 150 from the projection device 10 toward a plurality of directions by the first reflecting mirror 51 and the second reflecting mirror 52.

FIG. 29 is a conceptual diagram illustrating an example in which the images of the first projection area 211 and the second projection area 212 are guided to the imaging device 20 by the first reflecting mirror 51, the second reflecting mirror 52, and the half mirror 55. As illustrated in FIG. 29, the projection system 4 can guide the image of the projection area including images obtained by projecting light toward a plurality of directions to the imaging device 20, and can capture the images of the first projection area 211 and the second projection area 212 at once. In general, projection (FIG. 28) of the projection light 150 by the projection device 10 and imaging (FIG. 29) of the first projection area 211 and the second projection area 212 by the imaging device 20 are carried out simultaneously.

The functions and operations of the projection device 10, the imaging device 20, and the control device 30 included in the projection system 4 are similar to those of the first to third example embodiments. The projection system 4 captures images projected toward a plurality of projection areas, along with backgrounds of the projection areas, and determines whether there are abnormalities in the projection areas. When the projection system 4 determines that there is an abnormality in any one of the projection areas, the projection system 4 executes the safety control as illustrated in each of the first to third example embodiments.

As described above, the projection system according to this example embodiment can capture images of a plurality of projection areas at once by a single imaging device, while projecting the projection light toward the plurality of projection areas. Therefore, according to the projection system of this example embodiment, it is possible to safely project a desired projection image in a plurality of any projection areas.

The present invention has been described above by taking the above-described example embodiments as exemplary embodiments. However, the present invention is not limited to the above-described example embodiments. In other words, various modes that can be understood by those skilled in the art can be applied within the scope of the present invention.

The whole or part of the example embodiments described above can also be described as follows, but not limited to the following configurations.

(Supplementary Note 1)

A projection system including:

a projection device that projects light forming display information, in a projection area;

an imaging device that captures an image of a range including the projection area; and a control device that controls the projection device to project light, and the control device controls the imaging device to capture an image of the projection area, in which the control device includes:

an analysis circuit that accumulates image information about the projection area captured by the imaging device, and detects an abnormality in the projection area by comparing any one piece of accumulated image information about the projection area with image information about the projection area most recently captured by the imaging device; and a safety control circuit that executes safety control to change a projection condition for the projection device when an abnormality is detected in the projection area by the analysis circuit.

(Supplementary note 2)

The projection system according to Supplementary note 1, in which the safety control circuit controls to the projection device stop projection of light when an abnormality is detected in the projection area.

(Supplementary note 3)

The projection system according to Supplementary note 1, in which the safety control circuit controls the projection device to shift a projection direction of light when an abnormality is detected in the projection area.

(Supplementary note 4)

The projection system according to any one of Supplementary notes 1 to 3, in which the control device includes a distance measurement circuit that measures a distance from any one of locations on a projected surface including the projection area by using image information about the projection area.

(Supplementary note 5)

The projection system according to Supplementary note 4, in which the distance measurement circuit measures a distance based on a principle of triangulation by using image information about the projection area.

(Supplementary note 6)

The projection system according to Supplementary note 4 or 5, in which the control device controls the projection device to project spot light in the projection area, and controls the imaging device to measure a distance based on a principle of triangulation by using image information obtained by capturing an image of the spot light displayed in the projection area.

(Supplementary note 7)

The projection system according to Supplementary note 4 or 5, in which the control device controls the projection device to project a predetermined pattern in the projection area, and measures a distance by using image information obtained by capturing an image of the predetermined pattern displayed in the projection area by controlling the imaging device.

(Supplementary note 8)

The projection system according to Supplementary note 4 or 5, in which the control device controls the projection device to project an alignment pattern in which predetermined marks are aligned in the projection area, and controls the imaging device to detect a change in the projected surface by using image information obtained by capturing an image of the alignment pattern displayed in the projection area.

(Supplementary note 9)

The projection system according to any one of Supplementary notes 1 to 8, in which, when the control device detects a defect area in the display information, the control device determines that a reflector with a high reflectance is located in the defect area.
(Supplementary note 10)
The projection system according to Supplementary note 9, in which
the imaging device captures an image of a range including a detection area outside of the projection area, and
when the control device detects the reflector in the detection area, the control device calculates a positional relationship between the reflector and the projection area by measuring a distance from the reflector, and executes safety control at a timing when the reflector enters the projection area.
(Supplementary note 11)
The projection system according to any one of Supplementary notes 1 to 10, further including:
a reflecting mirror that is disposed on an emission axis of projection light from the projection device, and reflects the projection light toward a plurality of the projection areas; and
a half mirror that is disposed between the projection device and the reflecting mirror, lets the projection light pass through, and reflects images of a plurality of the projection areas being reflected by the reflecting mirror toward the imaging device.
(Supplementary note 12)
The projection system according to any one of Supplementary notes 1 to 11, in which
the projection device includes:
a light source that emits a laser beam,
a phase modulation type spatial light modulation element including a display part that displays a phase distribution corresponding to the display information; and
a projection optical system that projects reflected light of a laser beam irradiated on a display unit of the spatial light modulation element from the light source.
(Supplementary note 13)
A projection method including:
projecting light forming display information in a projection area;
capturing an image of a range including the projection area;
accumulating image information about the captured projection area;
detecting an abnormality in the projection area by comparing any one piece of accumulated image information about the projection area with image information about the projection area most recently captured; and
executing safety control to change a projection condition when an abnormality is detected in the projection area.
(Supplementary note 14)
A program recording medium recording a program for causing a computer to execute:
processing of projecting light forming display information, in a projection area;
processing of capturing an image of a range including the projection area;
processing of accumulating image information about the captured projection area;
processing of detecting an abnormality in the projection area by comparing any one piece of accumulated image information about the projection area with image information about the projection area most recently captured; and
processing of executing safety control to change a projection condition when an abnormality is detected in the projection area.

REFERENCE SIGNS LIST 1, 2, 3 Projection system
10 Projection device
11 Light source
12 Light source drive power supply
13 Spatial light modulation element
14 Modulation element control circuit
15 Projection optical system
20 Imaging device
21 Imaging element
23 Image processing processor
25 Internal memory
27 Output circuit
30 Control device
31 Imaging control circuit
33 Analysis circuit
35 Safety control circuit
37 Projection control circuit
40 Reflector
50 Reflection unit
51 First reflecting mirror
52 Second reflecting mirror
55 Half mirror
331 Input circuit
332 Image processing circuit
333 Storage circuit
334 Comparison circuit
335 Output circuit
336 Distance measurement circuit
371 Projection condition setting circuit
373 Storage circuit
375 Projection condition output circuit

The invention claimed is:
1. A projection system comprising:
a projector configured to project light forming display information in a projection area;
a camera configured to capture an image of a range including the projection area;
at least one memory storing instructions;
at least one processor connected to the at least one memory and configured to execute the instructions to:
control the projector to project light;
control the camera to capture an image of the projection area;
accumulate image information about the projection area captured by the camera;
detect an optical reflector in the projection area by comparing any one piece of accumulated image information about the projection area with image information about the projection area most recently captured by the camera; and
execute safety control to change a projection condition for the projector when the optical reflector is detected in the projection area;
a reflecting mirror configured to be disposed on an emission axis of projection light from the projector, and the reflecting mirror configured to reflect the projection light toward a plurality of the projection areas; and
a half mirror configured to be disposed between the projector and the reflecting mirror, the half mirror configured to let the projection light pass through, and the half mirror configured to reflect images of a plurality of the projection areas being reflected by the reflecting mirror toward the camera.

2. The projection system according to claim 1, wherein the at least one processor is configured to execute the instructions to control the projector to stop projection of light when the optical reflector is detected in the projection area.

3. The projection system according to claim 1, wherein the at least one processor is configured to execute the instructions to control the projector to shift a projection direction of light when the optical reflector is detected in the projection area.

4. The projection system according to claim 1, wherein the at least one processor is configured to execute the instructions to measure a distance from any one of locations on a projected surface including the projection area by using image information about the projection area.

5. The projection system according to claim 4, wherein the at least one processor is configured to execute the instructions to measure a distance based on a principle of triangulation by using image information about the projection area.

6. The projection system according to claim 4, wherein the at least one processor is configured to execute the instructions to:
control the projector to project spot light in the projection area; and
measure a distance based on a principle of triangulation by using image information obtained by capturing an image of the spot light displayed in the projection area by controlling the camera.

7. The projection system according to claim 4, wherein the at least one processor is configured to execute the instructions to:
control the projector to project a predetermined pattern in the projection area; and
measure a distance by using image information obtained by capturing an image of the predetermined pattern displayed in the projection area by controlling the camera.

8. The projection system according to claim 4, wherein the at least one processor is configured to execute the instructions to:
control the projector to project an alignment pattern in which predetermined marks are aligned in the projection area; and
control the camera to detect a change in the projected surface by using image information obtained by capturing an image of the alignment pattern displayed in the projection area.

9. The projection system according to claim 1, wherein, the at least one processor is configured to execute the instructions to:
detect a defect area in the display information; and
determine that the optical reflector is located in the defect area.

10. The projection system according to claim 9, wherein the camera captures an image of a range including a detection area outside of the projection area, and
wherein the at least one processor is configured to execute the instructions to:
detect the optical reflector in the detection area;
calculate a positional relationship between the optical reflector and the projection area by measuring a distance from the optical reflector; and
execute safety control at a timing when the optical reflector enters the projection area.

11. The projection system according to claim 1, wherein the projector includes:
a light source configured to emit a laser beam,
a phase modulation type spatial light modulation element including a display part that displays a phase distribution corresponding to the display information; and
a projection optical system configured to project reflected light of a laser beam irradiated on the display part of the spatial light modulation element from the light source.

12. A projection method comprising:
controlling a projector to project light forming display information in a projection area;
controlling a camera to capture an image of a range including the projection area;
accumulating image information about the captured projection area;
detecting an optical reflector in the projection area by comparing any one piece of accumulated image information about the projection area with image information about the projection area most recently captured; and
executing safety control to change a projection condition when the optical reflector is detected in the projection area, wherein,
the controlling the projector to project light comprises:
reflecting the projection light toward a plurality of the projection areas by a reflecting mirror configured to be disposed on an emission axis of projection light from the projector; and
reflecting images of a plurality of the projection areas being reflected by the reflecting mirror toward the camera by a half mirror configured to be disposed between the projector and the reflecting mirror, the half mirror let the projection light pass through.

13. A non-transitory program recording medium recording a program causing a computer to execute:
processing of controlling a projector to project light forming display information in a projection area;
processing of controlling a camera to capture an image of a range including the projection area;
processing of accumulating image information about the captured projection area;
processing of detecting an optical reflector in the projection area by comparing any one piece of accumulated image information about the projection area with image information about the projection area most recently captured; and
processing of executing safety control to change a projection condition when the optical reflector is detected in the projection area, wherein,
the processing of controlling the projector to project light comprises:
reflecting the projection light toward a plurality of the projection areas by a reflecting mirror configured to be disposed on an emission axis of projection light from the projector; and
reflecting images of a plurality of the projection areas being reflected by the reflecting mirror toward the camera by a half mirror configured to be disposed between the projector and the reflecting mirror, the half mirror let the projection light pass through.

* * * * *